United States Patent
St. John et al.

(10) Patent No.: US 10,245,555 B2
(45) Date of Patent: Apr. 2, 2019

(54) PRODUCTION OF MULTIVALENT ION-RICH PROCESS STREAMS USING MULTI-STAGE OSMOTIC SEPARATION

(71) Applicant: Gradiant Corporation, Woburn, MA (US)

(72) Inventors: Maximus G. St. John, Boston, MA (US); Looh Tchuin Choong, Somerville, MA (US); Prakash Narayan Govindan, Melrose, MA (US)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 15/752,626

(22) PCT Filed: Aug. 12, 2016

(86) PCT No.: PCT/US2016/046722
§ 371 (c)(1),
(2) Date: Feb. 14, 2018

(87) PCT Pub. No.: WO2017/030937
PCT Pub. Date: Feb. 23, 2017

(65) Prior Publication Data
US 2018/0236406 A1     Aug. 23, 2018

Related U.S. Application Data

(60) Provisional application No. 62/205,636, filed on Aug. 14, 2015.

(51) Int. Cl.
*B01D 37/00* (2006.01)
*B01D 39/00* (2006.01)
(Continued)

(52) U.S. Cl.
CPC .............. *B01D 61/58* (2013.01); *B01D 69/02* (2013.01); *C02F 1/441* (2013.01); *C02F 1/442* (2013.01);
(Continued)

(58) Field of Classification Search
CPC ........ B01D 37/00; B01D 37/04; B01D 39/00; B01D 39/14; B01D 39/16; B01D 61/00;
(Continued)

(56) References Cited

U.S. PATENT DOCUMENTS 2,151,990 A     3/1939    Ruys
2,606,820 A     8/1952    Viggo
(Continued)

FOREIGN PATENT DOCUMENTS

CA     2779732 A1    12/2012
CA     2818055       11/2013
(Continued)

OTHER PUBLICATIONS

U.S. Appl. No. 14/494,101, filed Sep. 23, 2014, Govindan et al.
(Continued)

*Primary Examiner* — Allison G Fitzsimmons
(74) *Attorney, Agent, or Firm* — Wolf, Greenfield & Sacks, P.C.

(57) ABSTRACT

Disclosed herein are systems and methods in which ion-selective separation and multi-stage osmotic separation is used to produce multivalent-ion-rich process streams. According to certain embodiments, multiple separations may be used to process an aqueous feed stream containing solubilized monovalent ions and solubilized multivalent ions to produce a stream enriched in the multivalent ions. The separations may be arranged, according to certain embodiments, to enhance the overall separation process such that the product stream contains—relative to the initial
(Continued)

aqueous feed stream—a high amount of multivalent ions, a high amount of water from the aqueous feed stream, and/or a high ratio of multivalent ions to monovalent ions.

16 Claims, 5 Drawing Sheets

(51) Int. Cl.
    *B01D 61/58*     (2006.01)
    *B01D 69/02*     (2006.01)
    *C02F 1/44*     (2006.01)
    *B01D 61/00*     (2006.01)
    *B01D 61/02*     (2006.01)

(52) U.S. Cl.
    CPC ............ *C02F 1/445* (2013.01); *B01D 61/002* (2013.01); *B01D 61/025* (2013.01); *B01D 61/027* (2013.01); *B01D 2311/25* (2013.01); *B01D 2317/025* (2013.01); *B01D 2325/20* (2013.01); *C02F 2301/046* (2013.01)

(58) Field of Classification Search
    CPC .... B01D 61/002; B01D 61/02; B01D 61/022; B01D 61/04; B01D 61/08; B01D 61/12; B01D 61/243; B01D 61/246; B01D 61/28; B01D 61/32; B01D 61/58; B01D 63/08; B01D 69/00; B01D 2311/00; B01D 2311/02; B01D 2311/04; B01D 2311/06; B01D 2311/08; B01D 2311/14; B01D 2311/25; B01D 2311/2649; C02F 1/00; C02F 1/001; C02F 1/44; C02F 1/441; C02F 1/442; C02F 1/445
    USPC ....... 210/634, 637, 641, 642, 649, 650, 651, 210/652, 681, 683, 685, 767, 790, 805, 210/806, 321.6, 321.75, 323.1, 433.1, 210/434, 500.21
    See application file for complete search history.

(56) References Cited

U.S. PATENT DOCUMENTS

| | | |
|---|---|---|
| 2,606,839 A | 8/1952 | Evans |
| 2,640,018 A | 5/1953 | Heath |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,489,652 A | 1/1970 | Williamson |
| 3,625,761 A | 12/1971 | Tate |
| 3,725,209 A | 4/1973 | Rosa |
| 3,906,250 A | 9/1975 | Loeb |
| 3,922,154 A | 11/1975 | Kawasaki et al. |
| 3,926,739 A | 12/1975 | Izumi |
| 4,156,645 A | 5/1979 | Bray |
| 4,224,148 A | 9/1980 | Lindman et al. |
| 4,251,367 A | 2/1981 | Santora |
| 4,312,755 A | 1/1982 | Hwang |
| 4,334,886 A | 6/1982 | Tani et al. |
| 4,452,696 A | 6/1984 | Lopez |
| 4,511,436 A | 4/1985 | El Din et al. |
| 4,563,337 A | 1/1986 | Kim |
| 4,576,724 A | 3/1986 | Colman et al. |
| 4,708,805 A | 11/1987 | D'Muhala |
| 4,735,722 A | 4/1988 | Krepak |
| 4,755,298 A | 7/1988 | Grinstead |
| 4,770,775 A | 9/1988 | Lopez |
| 4,806,244 A | 2/1989 | Guilhem |
| 4,832,115 A | 5/1989 | Albers et al. |
| 4,843,828 A | 7/1989 | Gladman |
| 4,944,882 A | 7/1990 | Ray et al. |
| 4,956,157 A | 9/1990 | Nasu |
| 4,973,201 A | 11/1990 | Paul et al. |
| 4,980,077 A | 12/1990 | Morris et al. |
| 4,981,593 A | 1/1991 | Priestley et al. |
| 5,015,391 A | 5/1991 | Mohn |
| 5,053,132 A | 10/1991 | Sirkar |
| 5,123,481 A | 6/1992 | Albers et al. |
| 5,167,828 A | 12/1992 | Emmons et al. |
| 5,190,656 A | 3/1993 | Paul et al. |
| 5,225,087 A | 7/1993 | Kardos |
| 5,238,574 A | 8/1993 | Kawahima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,656,161 A | 8/1997 | Solomon et al. |
| 5,840,195 A | 11/1998 | Delsalle et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,270,671 B1 | 8/2001 | Shorr et al. |
| 6,319,409 B1 | 11/2001 | Saitou et al. |
| 6,416,668 B1 | 7/2002 | Al-Samadi et al. |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot |
| 7,225,620 B2 | 6/2007 | Klausner et al. |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |
| 8,119,007 B2 | 2/2012 | Bajpayee et al. |
| 8,147,696 B1 | 4/2012 | Pandya |
| 8,197,693 B2 | 6/2012 | Al-Jlil |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,496,234 B1 | 7/2013 | Govindan et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,647,477 B2 | 2/2014 | Govindan et al. |

(56) References Cited

U.S. PATENT DOCUMENTS

| | | |
|---|---|---|
| 8,678,080 B2 | 3/2014 | Curole et al. |
| 8,679,347 B2 | 3/2014 | Al-Samadi |
| 8,695,343 B2 | 4/2014 | Moe |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,206,060 B1 | 12/2015 | Abusharkh |
| 9,221,694 B1 | 12/2015 | Govindan et al. |
| 9,266,748 B1 | 2/2016 | Govindan et al. |
| 9,266,762 B2 | 2/2016 | Wang et al. |
| 9,427,705 B1 | 8/2016 | Abusharkh |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,179 B2 | 4/2017 | Govindan et al. |
| 9,700,811 B2 | 7/2017 | Govindan et al. |
| 9,957,180 B2 | 5/2018 | Govindan et al. |
| 9,969,638 B2 | 5/2018 | Govindan et al. |
| 2003/0106860 A1 | 6/2003 | Peloquin et al. |
| 2003/0132166 A1 | 7/2003 | Rey |
| 2004/0187897 A1 | 9/2004 | Kenowski et al. |
| 2005/0023222 A1 | 2/2005 | Baillie |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | den Boestert et al. |
| 2007/0181480 A1 | 8/2007 | Lee |
| 2007/0235391 A1 | 10/2007 | Ylikangas et al. |
| 2008/0073200 A1 | 3/2008 | Godshall et al. |
| 2008/0102119 A1 | 5/2008 | Grovender |
| 2008/0116134 A1 | 5/2008 | Cartwright |
| 2008/0121585 A1 | 5/2008 | Mavis |
| 2008/0277344 A1 | 11/2008 | Sengupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0163471 A1 | 7/2010 | Elyanow et al. |
| 2010/0163472 A1 | 7/2010 | Thiers et al. |
| 2010/0234795 A1 | 9/2010 | Wallenäs |
| 2010/0242995 A1 | 9/2010 | Xiong et al. |
| 2010/0282675 A1 | 11/2010 | Sengupta et al. |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056822 A1 | 3/2011 | Elsharqawy et al. |
| 2011/0056878 A1 | 3/2011 | Matsushiro et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0215039 A1 | 9/2011 | Acernese et al. |
| 2011/0233137 A1 | 9/2011 | Cath et al. |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067819 A1 | 3/2012 | McGinnis |
| 2012/0067820 A1 | 3/2012 | Henthorne et al. |
| 2012/0090833 A1 | 4/2012 | Ligtelm et al. |
| 2012/0091061 A1 | 4/2012 | Al-Jlil |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0199524 A1 | 8/2012 | Bly et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0273417 A1 | 11/2012 | McGinnis et al. |
| 2012/0273422 A1 | 11/2012 | Wohlert |
| 2012/0279396 A1 | 11/2012 | Brammer et al. |
| 2012/0285886 A1 | 11/2012 | Liberman |
| 2012/0292259 A1 | 11/2012 | Marcin |
| 2012/0312755 A1 | 12/2012 | Ryan et al. |
| 2012/0318729 A1 | 12/2012 | Yip et al. |
| 2013/0008079 A1 | 1/2013 | Chung et al. |
| 2013/0043190 A1 | 2/2013 | Al-Samadi |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1 | 4/2013 | Moe et al. |
| 2013/0092622 A1 | 4/2013 | Kas et al. |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0193074 A1 | 8/2013 | Voigt et al. |
| 2013/0199921 A1 | 8/2013 | McGovern |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0256228 A1 | 10/2013 | Bharwada et al. |
| 2013/0318743 A1 | 12/2013 | Chinta et al. |
| 2014/0008291 A1 | 1/2014 | Tang et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Passarelli |
| 2014/0067958 A1 | 3/2014 | Bradley et al. |
| 2014/0069821 A1 | 3/2014 | Marcin et al. |
| 2014/0116956 A1 | 5/2014 | Yuan et al. |
| 2014/0151300 A1 | 6/2014 | Savage et al. |
| 2014/0197022 A1 | 7/2014 | Antar et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083577 A1 | 3/2015 | Govindan et al. |
| 2015/0083656 A1 | 3/2015 | Williams |
| 2015/0107840 A1 | 4/2015 | Ligthelm et al. |
| 2015/0107841 A1 | 4/2015 | Suijkerbuijk et al. |

(56) References Cited

U.S. PATENT DOCUMENTS

| | | |
|---|---|---|
| 2015/0129410 A1 | 5/2015 | Govindan et al. |
| 2015/0353397 A1 | 12/2015 | Cath et al. |
| 2016/0001235 A1 | 1/2016 | Frisk |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2016/0339390 A1 | 11/2016 | Abusharkh |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |
| 2018/0008919 A1 | 1/2018 | Tierney, III et al. |
| 2018/0036682 A1 | 2/2018 | Nicoll et al. |
| 2018/0104649 A1 | 4/2018 | Govindan et al. |

FOREIGN PATENT DOCUMENTS

| | | |
|---|---|---|
| CA | 2821453 | 1/2014 |
| CA | 2816746 | 4/2014 |
| CA | 2821458 | 7/2014 |
| CN | 1623936 A | 6/2005 |
| CN | 1856447 A | 11/2006 |
| CN | 100999364 A | 7/2007 |
| CN | 101056693 A | 10/2007 |
| CN | 101397152 A | 4/2009 |
| CN | 101636354 A | 1/2010 |
| CN | 101717161 A | 6/2010 |
| CN | 102143786 A | 8/2011 |
| CN | 102438957 A | 5/2012 |
| CN | 102725236 A | 10/2012 |
| CN | 102933507 A | 2/2013 |
| DE | 2145861 A1 | 11/1972 |
| EP | 0 207 390 | 1/1987 |
| EP | 0 253 287 A1 | 1/1988 |
| EP | 0 623 561 A1 | 11/1994 |
| EP | 1775267 A2 | 4/2007 |
| FR | 1582201 A | 9/1969 |
| FR | 2561637 A1 | 9/1985 |
| GB | 821939 A | 10/1959 |
| GB | 1013767 A | 12/1965 |
| GB | 1036920 A | 7/1966 |
| GB | 1444241 A | 7/1976 |
| GB | 2395946 A | 6/2004 |
| JP | S55-147199 | 11/1980 |
| JP | H05-208199 A | 8/1993 |
| JP | 2018-001111 A | 1/2018 |
| KR | 101229482 B1 | 2/2013 |
| WO | WO 1995/027683 | 10/1995 |
| WO | WO 2000/000273 A1 | 1/2000 |
| WO | WO 01/14256 A1 | 3/2001 |
| WO | WO 02/32813 A1 | 4/2002 |
| WO | WO 2005/012185 | 2/2005 |
| WO | WO 2007/128062 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2008/137082 | 11/2008 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/159203 | 11/2012 |
| WO | WO 2013/012548 A1 | 1/2013 |
| WO | WO 2013/037047 | 3/2013 |
| WO | WO 2013/078124 A1 | 5/2013 |
| WO | WO 2013/158315 A1 | 10/2013 |
| WO | WO 2013/159220 | 10/2013 |
| WO | WO 2014/058696 A1 | 4/2014 |
| WO | WO 2014/088826 A1 | 6/2014 |
| WO | WO 2014/121153 | 8/2014 |
| WO | WO 2014/144778 A1 | 9/2014 |
| WO | WO 2014/150848 A1 | 9/2014 |
| WO | WO 2014/162094 | 10/2014 |
| WO | WO 2014/188450 A1 | 11/2014 |
| WO | WO 2014/200829 | 12/2014 |
| WO | WO 2015/021062 | 2/2015 |
| WO | WO 2015/038983 | 3/2015 |
| WO | WO 2015/042584 | 3/2015 |
| WO | WO 2015/061194 A1 | 4/2015 |
| WO | WO 2017/019944 A1 | 2/2017 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |
| WO | WO 2018/075637 A1 | 4/2018 |

OTHER PUBLICATIONS

U.S. Appl. No. 15/041,977, filed Feb. 11, 2016, St. John et al.
U.S. Appl. No. 14/719,295, filed May 21, 2015, St. John et al.
U.S. Appl. No. 14/719,299, filed May 21, 2015, St. John et al.
U.S. Appl. No. 15/747,907, filed Jan. 26, 2018, Choong et al.
U.S. Appl. No. 15/752,619, filed Feb. 14, 2018, St. John et al.
U.S. Appl. No. 15/757,803, filed Mar. 6, 2018, Choong et al.
U.S. Appl. No. 15/752,631, filed Feb. 14, 2018, Govindan et al.
U.S. Appl. No. 15/641,617, filed Jul. 5, 2017, Tierney, III et al.
U.S. Appl. No. 15/364,785, filed Nov. 30, 2016, Andrews et al.
International Search Report and Written Opinion for PCT/US16/46722 dated Jan. 5, 2017.
International Preliminary Report on Patentability for PCT/US16/46722 dated Mar. 1, 2018.
[No Author Listed], Accepta 4360 Material Safety Data Sheet. Accepta Ltd. Manchester, UK. Jul. 19, 2011. 5 pages.
[No Author Listed], Caustic Soda 50% Material Safety Data Sheet. Univar. Redmond, Washington. Apr. 8, 2013. 10 pages.
[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>.
[No Author Listed], Everything you want to know about Coagulation & Flocculation. Chapter 1: The Electrokinetic Connection. Zeta-Meter, Inc. Staunton, VA. 4th Edition. 1993:1-8.
[No Author Listed], F0 Plant Completes 1-Year of Operation. Water Desalination Report Nov. 15, 2010:2 pages.
[No Author Listed], Hi-Cal Hydrate Material Safety Data Sheet. Chemical Lime Co. Fort Worth, Texas. May 1, 2008. 6 pages.
[No Author Listed], Polyaluminum Chloride Solution Material Safety Data Sheet. GEO Specialty Chemicals, Ltd. Little Rock, Arkansas. Mar. 12, 2015. 11 pages.
[No Author Listed], Servco 1010 Material Safety Data Sheet. Servco Chemicals. Lubbock, Texas. Aug. 7, 2013. 4 pages.
[No Author Listed], Soda Ash Material Safety Data Sheet. Univar. Redmond, Washington. Apr. 7, 2003. 10 pages.
Achilli et al., Selection of inorganic-based draw solutions for forward osmosis applications. Journal of Membrane Science. 2010;364:233-41. Epub Aug. 14, 2010.
Akram et al., Energy Utilization of Brine from an MSF Desalination Plant by Pressure Retarded Osmosis. The International Desalination Association World Congress on Desalination and Water Reuse. Tianjin, China. Oct. 2013 12 pages.
Al-Hallaj et al., Solar desalination with a humidification-dehumidification cycle: performance of the unit. Desalination. 1998;120:273-80.
Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>. 2 pages.

(56) References Cited

OTHER PUBLICATIONS

Aramco, Saudi Aramco's 'Smart Water' May Aid Oil Production. Rigzone. Jul 29, 2009. <http://www.rigzone.com/news/article_pf.asp?a_id=78707> Last accessed Jul. 30, 2015. 1 page.

Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.

Banchik et al., Thermodynamic Analysis of a Reverse Osmosis Desalination System Using Forward Osmosis for Energy Recovery. Proceedings of the ASME 2012 International Mechanical Engineering Congress & Exposition. American Society of Mechanical Engineers. Houston, Texas. Nov. 9-15, 2012. 13 pages.

Cath et al., A Novel Hybrid Forward Osmosis Process for Drinking Water Augmentation Using Impaired Water and Saline Water Sources. WERC and Water Research Foundation. 2009:84 pages.

Chung et al., Forward osmosis processes: Yesterday, today and tomorrow. Desalination. 2012;287:78-81. Epub Jan. 11, 2011.

El-Dessouky et al., Multiple-effect evaporation desalination systems: thermal analysis. Desalination. 1999;125:259-76.

Ge et al., Exploration of polyelectrolytes as draw solutes in forward osmosis processes. Water Research. 2012;46:1318-26. Epub Dec. 27, 2011.

Global Water Intelligence, Water Desalination Report. Tom Pankratz, ed. Dec. 17, 2012;48(48):1-4.

Govindan, Thermal Design of Humidification Dehumidification Systems for Affordable and Small-scale Desalination. Doctoral Thesis. Massachusetts Institute of Technology. Sep. 2012 286 pages.

Gude, Energy consumption and recovery in reverse osmosis. Desalination and Water Treatment. 2011;36(1-3):239-60.

Huang et al., The bridging force between colloidal particles in a polyelectrolyte solution. Langmuir. Nov. 27, 2012;28(47):16300-5. doi:10.1021/1a303918p.

Khayet et al., Determination of surface and bulk pore sizes of flat-sheet and hollow-fiber membranes by atomic force microscopy, gas permeation and solute transport methods. Desalination. 2003;158:57-64.

Klausner et al., Evaporative heat and mass transfer for the diffusion driven desalination process. Heat Mass Transfer. 2006;42:528-36.

Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

Li, Experimental Analysis of Produced Water Desalination by a Humidification-Dehumidification Process. 2009. 62 pages.

Li, Mineral precipitation and deposition in cooling systems using impaired waters: mechanisms, kinetics, and inhibition. Dissertation defended Jul. 27, 2010. 224 pages.

McGinnis et al., Pilot demonstration of the NH3/CO2 forward osmosis desalination process on high salinity brines. Desalination. Mar. 2013;312:67-74. Supporting information included.

Moghadasi et al., Scale deposits in porous media and their removal by EDTA injection. ECI Symposium Series. 2007. vol. RP5. Article 10. p. 57-70.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Sahin, A Mathematical Model for Explanation of Ion Exchange of the Boric Acid Adsorption. Jour. Chem. Soc. Pak. 1998;20(1):12-8.

Sinex, Edta—A molecule with a complex story. University of Bristol, School of Chemistry. <www.chm.bris.ac.uk/motm/edta/edtah.htm> (accessed Jan. 8, 2013). Aug. 1, 2007.

Thiel et al., Hybridization of Humidification-Dehumidification and Pressure Retarded Osmosis for Brine Concentration Applications. The International Desalination Association World Congress on Desalination and Water Reuse. San Diego, California. Aug.-Sep. 2015 8 pages.

Zamen et al., Improvement of solar humidification-dehumidification desalination using multi-stage process. 6 pages. Accessed Jun. 6, 2014.

Burk, New Technology Spotlight. CaribDA News. 2012 Fall;2(4):6-7.

Kim et al., Effect of PEG additive on membrane formation by phase inversion. Journal of Membrane Science. 1998;138:153-63.

Tiraferri et al., Relating performance of thin-film composite forward osmosis membranes to support layer formation and structure. Journal of Membrane Science. Nov. 12, 2010;367:340-52.

PRODUCTION OF MULTIVALENT ION-RICH PROCESS STREAMS USING MULTI-STAGE OSMOTIC SEPARATION

RELATED APPLICATIONS

This application is a U.S. National Stage patent application based on International Application No. PCT/US2016/046722, filed Aug. 12, 2016, which claims priority under 35 U.S.C. § 119(e) to U.S. Provisional Patent Application Ser. No. 62/205,636, filed Aug. 14, 2015 and entitled "Production of Multivalent Ion-Rich Process Streams Using Multi-Stage Osmotic Separation," each of which is incorporated herein by reference in its entirety for all purposes.

TECHNICAL FIELD

Systems and methods in which multi-stage osmotic separation is used to produce multivalent ion-rich process streams are generally described.

SUMMARY

Systems and methods in which multivalent-ion-rich process streams are produced using multi-stage osmotic separation are generally described. Certain embodiments are related to processes and methods in which an aqueous feed stream comprising multivalent ions and monovalent ions is processed such that the multivalent ions are at least partially separated from the monovalent ions, producing a multivalent-ion-rich aqueous stream and a monovalent-ion-rich aqueous stream. Certain embodiments are related to the use of multiple osmosis separation steps to at least partially separate the water and the monovalent ions within the monovalent-ion-enriched stream. In some such embodiments, at least a portion of the water from the monovalent-ion-enriched stream is combined with at least a portion of the multivalent-ion-enriched stream to produce a monovalent-ion-enriched product stream containing a relatively large amount of the multivalent ions and water from the original aqueous feed stream. The subject matter of the present invention involves, in some cases, interrelated products, alternative solutions to a particular problem, and/or a plurality of different uses of one or more systems and/or articles.

Certain embodiments are related to a method. The method comprises, according to some embodiments, transporting an aqueous feed stream containing solubilized monovalent ions and solubilized multivalent ions into an ion-selective membrane separator comprising an ion-selective membrane to produce a first permeate stream containing at least about 75% of the solubilized monovalent ions from the aqueous feed stream and a first retentate stream containing at least about 75% of the solubilized multivalent ions from the aqueous feed stream; transporting at least a portion of the first permeate stream to a first osmotic membrane separator comprising a first osmotic membrane, such that the first permeate stream portion is transported across a first side of the first osmotic membrane; transporting a first draw inlet stream across a second side of the first osmotic membrane; applying a hydraulic pressure to the first side of the first osmotic membrane such that water is transported from the first permeate stream through the first osmotic membrane to the first draw inlet stream to produce a first draw product stream having a lower osmotic pressure than the first draw inlet stream; transporting at least a portion of the first draw product stream from the second side of the first osmotic membrane to a second osmotic membrane separator comprising a second osmotic membrane, such that the first draw product stream portion is transported across a first side of the second osmotic membrane; transporting a second draw inlet stream across a second side of the second osmotic membrane; applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream; and combining at least a portion of the second draw product stream with at least a portion of the first retentate stream.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Disclosed herein are systems and methods in which ion-selective separation and multi-stage osmotic separation is used to produce multivalent-ion-rich process streams. According to certain embodiments, multiple separations may be used to process an aqueous feed stream containing solubilized monovalent ions and solubilized multivalent ions to produce a stream enriched in the multivalent ions. The separations may be arranged, according to certain embodiments, to enhance the overall separation process such that the product stream contains—relative to the initial aqueous feed stream—a high amount of multivalent ions, a high amount of water from the aqueous feed stream, and/or a high ratio of multivalent ions to monovalent ions.

Certain embodiments comprise transporting an aqueous feed stream containing solubilized monovalent ions and solubilized multivalent ions into the ion-selective membrane separator to at least partially separate the solubilized monovalent ions and the solubilized multivalent ions. Transporting the aqueous feed stream containing the solubilized monovalent ions and the solubilized multivalent ions through the ion-selective membrane separator can produce a first permeate stream and a first retentate stream.

Figure 1A:
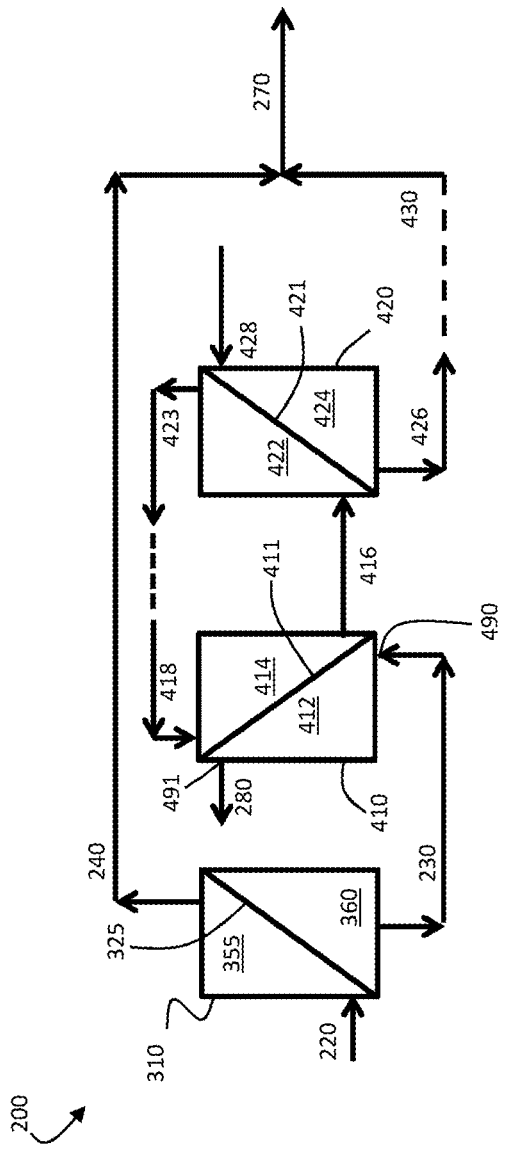
FIG. 1A is a schematic illustration of a system for producing a multivalent-ion-enriched product stream, comprising an ion-selective membrane separator and at least two osmotic membrane separators.

FIG. 1A is a schematic diagram of an exemplary system 200, which can be used to produce multivalent-ion-enriched product streams, according to certain embodiments. In FIG. 1A, system 200 comprises ion-selective membrane separator 310, which comprises ion-selective membrane 325. The ion-selective membrane separator can be configured to receive aqueous feed stream 220 comprising solubilized monovalent ions and solubilized multivalent ions. Ion-selective membrane 325 of ion-selective membrane separator 310 comprises retentate side 355 and permeate side 360. According to certain embodiments, an aqueous feed stream 220 containing solubilized monovalent ions and solubilized multivalent ions can be transported into ion-selective membrane separator 310 to produce first permeate stream 230 and first retentate stream 240.

Certain embodiments comprise transporting an aqueous feed stream containing solubilized monovalent ions and solubilized multivalent ions into the ion-selective membrane separator to produce a first permeate stream containing at least about 75% (or at least about 85%, at least about 90%, at least about 95%, or at least about 99%, on a molar basis) of the solubilized monovalent ions from the aqueous feed stream. In some embodiments, the retentate side of the ion-selective membrane can be exposed to the aqueous feed stream (and, optionally, a hydraulic pressure can be applied to the aqueous feed stream on the retentate side of the ion-selective membrane separator) such that at least a portion (e.g., at least about 75%, at least about 85%, at least about 90%, at least about 95%, or at least about 99%, on a molar basis) of the solubilized monovalent ions from the aqueous feed stream are transported from the first side of the ion-selective membrane, through ion-selective membrane, to the second side of the ion-selective membrane. For example, in FIG. 1A, certain embodiments comprise exposing retentate side 355 of ion-selective membrane 325 within ion-selective membrane separator 310 to aqueous feed stream 220 (and, optionally, applying a hydraulic pressure to retentate side 355 of ion-selective membrane 325) such that at least a portion (e.g., at least about 75%, at least about 85%, at least about 90%, at least about 95%, or at least about 99%, on a molar basis) of the solubilized monovalent ions from aqueous feed stream 220 are transported from first side 355 of ion-selective membrane 325, through ion-selective membrane 325, to second side 360 of ion-selective membrane 325.

In some embodiments, at least a portion (e.g., at least about 75%, at least about 85%, at least about 90%, at least about 95%, or at least about 99%, on a molar basis) of the solubilized multivalent ions from the aqueous feed stream are prevented from being transported through the ion-selective membrane, and remain on the retentate side of the ion-selective membrane. Operation in this manner can result in the creation of a multivalent-ion-enriched retentate stream and a monovalent-ion-enriched permeate stream. For example, referring to FIG. 1A, in some embodiments, at least a portion (e.g., at least about 75%, at least about 85%, at least about 90%, at least about 95%, or at least about 99%, on a molar basis) of the solubilized multivalent ions from aqueous feed stream 220 are prevented from being transported through ion-selective membrane 325, and remain on retentate side 355 of ion-selective membrane 325. Operation in this manner can result in the creation of multivalent-ion-enriched retentate stream 240 and monovalent-ion-enriched permeate stream 230.

A variety of types of ion-selective membranes may be used, according to certain embodiments. Generally, the ion-selective membrane is chosen such that it may transmit solubilized monovalent ions while inhibiting (or completely preventing) the transmission of solubilized multivalent ions. For example, in FIG. 1A, ion-selective membrane 325 may be configured to transmit solubilized monovalent ions from retentate side 355 to permeate side 360 while inhibiting (or completely preventing) the transmission of solubilized multivalent ions from retentate side 355 to permeate side 360. Such selective separation may be achieved, for example, by using a membrane having appropriately sized pores (e.g., pores with sizes that allow for transmission of solubilized monovalent ions and the retention of solubilized multivalent ions). Achieving appropriate separation may also involve, according to certain embodiments, establishing appropriate stream flow rate(s) and/or applying an appropriate hydraulic pressure to the retentate side of the membrane, as discussed in more detail below. In some embodiments, the ion-selective membrane is made of a bulk material (e.g., a polymer such as polyethylene terephthalate, polysulfone, polyethersulfone; a metal such as aluminum; oxides such as alumina; and composites of these) through which pores extend. According to certain embodiments, the ion-selective membrane has a molecular weight cut off of at least about 200 Da, such as from about 200 Da to about 1000 Da, from about 200 Da to about 800 Da, or from about 200 Da to about 400 Da. The molecular weight cutoff of a membrane can be measured, for example, by determining the lowest molecular weight of polyethylene glycol (PEG) or polyethylene oxide (PEO) at which rejection of the PEG or PEO with that molecular weight is greater than 90%, when present at a feed concentration of 200 ppm, a feed pressure of 15 psi, and a feed temperature of 20° C. The ion-selective membrane may have, according to certain embodiments, an average pore size of at least about 1 nanometer, such as from about 1 nanometer to about 10 nanometers. The ion-selective membrane may have, according to certain embodiments, an average pore size of at least about 1 nanometer, such as from about 1 nanometer to about 10 nanometers. While the ion-selective membranes are generally illustrated as being planar in the figures, it should be understood that the membranes need not necessarily be planar. For example, in some embodiments, the ion-selective membrane(s) can be a spiral-wound membrane or have any other suitable form factor. In some embodiments, the ion-selective membrane comprises a nanofiltration membrane. Examples of commercially available membranes that can be used as an ion-selective membrane include, according to certain embodiments, Dow Filmtec NF-90, GE Osmonics DK series, and Synder NFW membranes.

According to certain embodiments, the first retentate stream (which is rich in multivalent ions) can be use as all or part of a multivalent-ion-enriched product stream, as described in more detail below. According to certain embodiments, the first permeate stream can be processed (e.g., using a multi-step osmotic separation process, as described below) such that at least a portion of the water from the first permeate stream is combined with at least a portion of the first retentate stream. The combination of the first retentate stream portion and the portion of water from the first permeate stream can produce a monovalent-ion-enriched product stream that is more dilute than the first retentate stream.

According to certain embodiments, at least a portion of the first permeate stream (which can be relatively rich in monovalent ions from the aqueous feed stream) can be transported to a multi-step osmosis process (e.g., a multi-step reverse osmosis process). The multi-step osmosis process can include, for example, a plurality of osmotic membrane separators arranged, according to certain embodiments, in series. The multi-step osmosis process can be configured, according to certain embodiments, such that water and solubilized monovalent ions are separated via a plurality of successive osmotic separation steps. The use of successive separation steps can be advantageous, for example, when the concentration of solubilized monovalent ions within the monovalent-ion-enriched stream is relatively high and reverse osmosis is being used to separate water and solubilized monovalent ions. In some such cases, the use of multiple osmotic membranes can reduce the minimum amount of hydraulic pressure that needs to be applied to the membranes, resulting in more efficient overall separation. As an exemplary, non-limiting illustration, if one desires to remove monovalent ions from a monovalent-ion-enriched stream with an osmotic pressure of 60 bar using a single osmotic membrane and without having a saline stream on the opposite side of the osmotic membrane, one would need to use a mechanically robust osmotic membrane capable of withstanding very high hydraulic pressures (e.g., above 60 bar). Such membranes are typically difficult and expensive to manufacture. Certain embodiments employ the recognition that the use of multiple reverse osmosis membranes, each operated using relatively low hydraulic pressure gradients applied across the osmotic membrane, can be used to perform a stepwise process in which each reverse osmosis step gradually increases the purity of water until the desired final level of water purity is achieved. In addition, certain embodiments employ the recognition that the use of one or more draw streams including a solubilized species (e.g., ion or non-ion species) that raises the osmotic pressure of the draw stream(s) can lower the differential hydraulic pressure required to transport water across a given osmotic membrane.

One example of a system including series-connected osmotic membrane separators is shown in FIG. 1A. In FIG. 1A, system 200 comprises first osmotic membrane separator 410. The first osmotic membrane separator can comprise an osmotic membrane, which can be used to at least partially separate solubilized monovalent ions from water. For example, in FIG. 1A, first osmotic membrane separator 410 comprises osmotic membrane 411, which has a retentate side 412 and a permeate side 414. Additional osmotic membrane separators can also be employed. For example, in FIG. 1A, system 400 comprises a second osmotic membrane separator 420, in addition to first osmotic membrane separator 410. Second osmotic membrane separator 420 comprises osmotic membrane 421, which comprises retentate side 422 and permeate side 424.

A variety of types of osmotic membranes may be used, according to certain embodiments. Those of ordinary skill in the art are familiar with osmotic membranes. Generally, osmotic membranes selectively transmit water while inhibiting (or completely preventing) the transmission of ions (including both solubilized monovalent ions and solubilized multivalent ions) through the membrane. For example, in FIG. 1A, first osmotic membrane 411 may be configured to transmit water from retentate side 412 to permeate side 414 while inhibiting (or completely preventing) the transmission of solubilized monovalent ions from retentate side 412 to permeate side 414, as described in more detail below. Such selective separation may be achieved, for example, by selecting a membrane having appropriately sized pores. In some embodiments, the osmotic membrane is made of a bulk material through which pores extend. The osmotic membrane may have, according to certain embodiments, an average pore size of less than about 1 nanometer. According to certain embodiments, the osmotic membrane has a molecular weight cut off about 100 Da or less. Generally, the sizes of the pores within the osmotic membrane that allow for selective retention of ions will be smaller than the pores within the ion-selective membrane that allow for the transmission of solubilized monovalent ions and the retention of solubilized multivalent ions. The bulk material of the osmotic membrane can comprise, for example, a metal, a ceramic, a polymer (e.g., polyamides, polyethylenes, polyesters, poly(tetrafluoroethylene), polysulfones, polyethersulfones, polycarbonates, polypropylenes, poly(acrylates)), and/or composites or other combinations of these. While the osmotic membranes are generally illustrated as being planar in the figures, it should be understood that the osmotic membranes need not necessarily be planar. For example, in some embodiments, the osmotic membrane(s) can be a spiral-wound membrane or have any other suitable form factor. Examples of commercially available osmotic membranes that can be used in association with certain of the embodiments described herein include, but are not limited to, those commercially available from Dow Water and Process Solutions (e.g., FilmTec™ membranes), Hydranautics, GE Osmonics, and Toray Membrane, among others known to those of ordinary skill in the art.

Selective transport of water (relative to solubilized species such as solubilized monovalent and/or solubilized multivalent ions) through an osmotic membrane can be achieved via a transmembrane net driving force (i.e., a net driving force through the thickness of the membrane), according to certain embodiments. Generally, the transmembrane net driving force ($\Delta_\chi$) is expressed as:

$$\Delta_\chi = \Delta P - \Delta \Pi = (P_R - P_P) - (\Pi_R - \Pi_P) \quad [1]$$

wherein $P_R$ is the hydraulic pressure on the retentate side of the osmotic membrane, $P_P$ is the hydraulic pressure on the permeate side of the osmotic membrane, $\Pi_R$ is the osmotic pressure of the stream on the retentate side of the osmotic membrane, and $\Pi_P$ is the osmotic pressure of the stream on the permeate side of the osmotic membrane. $(P_R - P_P)$ can be referred to as the transmembrane hydraulic pressure gradient, and $(\Pi_R - \Pi_P)$ can be referred to as the transmembrane osmotic pressure gradient.

Those of ordinary skill in the art are familiar with the concept of osmotic pressure. The osmotic pressure of a particular liquid is an intrinsic property of the liquid. The osmotic pressure can be determined in a number of ways, with the most efficient method depending upon the type of liquid being analyzed. For certain solutions with relatively low molar concentrations of ions, osmotic pressure can be accurately measured using an osmometer. In other cases, the osmotic pressure can simply be determined by comparison with solutions with known osmotic pressures. For example, to determine the osmotic pressure of an uncharacterized solution, one could apply a known amount of the uncharacterized solution on one side of a non-porous, semi-permeable, osmotic membrane and iteratively apply different solutions with known osmotic pressures on the other side of the osmotic membrane until the differential pressure through the thickness of the membrane is zero.

The osmotic pressure ($\Pi$) of a solution containing n solubilized species may be estimated as:

$$\Pi = \Sigma_{j=1}^{n} i_j M_j RT \qquad [2]$$

wherein $i_j$ is the van't Hoff factor of the $j^{th}$ solubilized species, $M_j$ is the molar concentration of the $j^{th}$ solubilized species in the solution, R is the ideal gas constant, and T is the absolute temperature of the solution. Equation 2 generally provides an accurate estimate of osmotic pressure for liquid with low concentrations of solubilized species (e.g., concentrations at or below between about 4 wt % and about 6 wt %). For many liquid comprising solubilized species, at species concentrations above around 4-6 wt %, the increase in osmotic pressure per increase in salt concentration is greater than linear (e.g., slightly exponential).

Certain of the osmotic membranes described herein can be used to perform reverse osmosis. Reverse osmosis generally occurs when the osmotic pressure on the retentate side of the osmotic membrane is greater than the osmotic pressure on the permeate side of the osmotic membrane, and a hydraulic pressure is applied to the retentate side of the osmotic membrane such that the hydraulic pressure on the retentate side of the osmotic membrane is sufficiently greater than the hydraulic pressure on the permeate side of the osmotic membrane to cause water to be transported from the retentate side of the osmotic membrane to the permeate side of the osmotic membrane. Generally, such situations result when the transmembrane hydraulic pressure gradient ($P_R - P_P$) is greater than the transmembrane osmotic pressure gradient ($\Pi_R - \Pi_P$) such that water is transported from the first side of the osmotic membrane to the second side of the osmotic membrane (rather than having water transported from the second side of the osmotic membrane to the first side of the osmotic membrane, which would be energetically favored in the absence of the pressure applied to the first side of the osmotic membrane). Operating the osmotic membrane to perform reverse osmosis can comprise applying a hydraulic pressure to the stream on the second side of the osmotic membrane, according to certain embodiments. Referring to FIG. 1A, for example, first osmotic membrane 411 can be used to perform reverse osmosis, for example, when the osmotic pressure on retentate side 412 of osmotic membrane 411 is higher than the osmotic pressure on permeate side 414, a hydraulic pressure is applied to retentate side 412 such that the hydraulic pressure on retentate side 412 is higher than the hydraulic pressure on permeate side 414, and the difference between the hydraulic pressure on retentate side 412 and the hydraulic pressure on permeate side 414 is greater than the difference between the osmotic pressure on retentate side 412 and the osmotic pressure on permeate side 414. In such cases, water can be transported from retentate side 412 of osmotic membrane 411 to permeate side 414 of osmotic membrane 411.

Certain of the osmotic membranes could also be used, according to certain embodiments, to perform forward osmosis. Forward osmosis generally occurs when the osmotic pressure on the permeate side of the osmotic membrane is greater than the osmotic pressure on the retentate side of the osmotic membrane such that water is transported from the retentate side of the osmotic membrane to the permeate side of the osmotic membrane. In forward osmosis systems, water generally is transported from the retentate side of the osmotic membrane to the permeate side of the osmotic membrane as long as the hydraulic pressure difference between the permeate side of the osmotic membrane and the retentate side of the osmotic membrane is not sufficiently high to overcome the osmotic pressure difference between the retentate and permeate sides of the osmotic membrane. In this way, the permeate flow and the osmotic driving force are aligned in the same direction. In certain forward osmosis arrangements, the stream on the permeate side of the osmotic membrane can initiate the transport of water from the stream on the retentate side of the osmotic membrane and through the osmotic membrane from the retentate side to the permeate side. Referring to FIG. 1A, for example, in some embodiments, osmotic membrane 411 can be used to perform forward osmosis, for example, when the osmotic pressure on permeate side 414 of osmotic membrane 411 is greater than the osmotic pressure on retentate side 412 of osmotic membrane 411, and when the hydraulic pressure gradient from permeate side 414 to retentate side 412 ($P_{414} - P_{412}$) is not large enough to overcome the difference in the osmotic pressure between permeate side 414 and retentate side 412. In such cases, water can be transported from retentate side 412 of osmotic membrane 411 to permeate side 414 of osmotic membrane 411.

In some cases, hydraulic pressure may be applied to the retentate side of the osmotic membrane to enhance the forward osmosis process. For example, in some instances in which the stream on the retentate side of the osmotic membrane has a lower osmotic pressure than the stream on the permeate side of the osmotic membrane, a hydraulic pressure may be applied to the retentate side of the osmotic membrane such that the hydraulic pressure of the stream on the retentate side of the osmotic membrane is higher than the hydraulic pressure of the stream on the permeate side of the osmotic membrane. The applied pressure can increase the rate at which water is transported from the retentate side of the osmotic membrane to the permeate side of the osmotic membrane. Such arrangements are sometimes referred to herein as pressure-assisted forward osmosis (which is a particular type of forward osmosis). Referring to FIG. 1A, for example, osmotic membrane 411 can be used to perform pressure assisted forward osmosis, for example, by applying a hydraulic pressure to retentate side 412 of osmotic membrane 411 such that the hydraulic pressure of the stream on retentate side 412 of osmotic membrane 411 is higher than the hydraulic pressure of the stream on permeate side 414 of osmotic membrane 411. Of course, the use of an applied pressure to enhance forward osmosis is not generally required, and in some embodiments, forward osmosis is performed in the substantial absence of an applied pressure (e.g., such that the hydraulic pressure gradient through the osmotic membrane is less than or equal to about 0.1 bar).

Generally, whether the osmotic membrane is used to perform reverse osmosis or forward osmosis is determined by the osmotic pressures of the streams on either side of the osmotic membrane. For example, referring to FIG. 1A, according to certain embodiments, if the osmotic pressure on retentate side 412 of osmotic membrane 411 is higher than the osmotic pressure on permeate side 414 of osmotic membrane 411, and transport of water from retentate side 412 to permeate side 414 is desired, reverse osmosis will be performed. On the other hand, in some cases, the osmotic pressure on retentate side 412 of osmotic membrane 411 may be lower than the osmotic pressure on permeate side 414 of osmotic membrane 411, and transport of water from retentate side 412 to permeate side 414 may be desired, in which case, forward osmosis (pressure assisted or otherwise) may be performed.

Certain embodiments comprise transporting at least a portion of the first permeate stream to a first osmotic membrane separator comprising a first osmotic membrane, such that the first permeate stream portion is transported across a first side of the first osmotic membrane. For example, referring to FIG. 1A, certain embodiments comprise transporting at least a portion of first permeate stream 230 to first osmotic membrane separator 410 comprising first osmotic membrane 411, such that the first permeate stream 230 is transported across retentate side 412 of first osmotic membrane 411.

Unless explicitly indicated otherwise, streams that are transported "across" a side of a membrane are transported along the facial area of the membrane, while streams that are transported "through" a membrane are transported through the thickness of the membrane. For example, referring to FIG. 1A, first permeate stream 230 is transported across retentate side 412 of first osmotic membrane 411 when first permeate stream 230 is transported from inlet 490 to outlet 491. In the other hand, a portion of the water within the first permeate stream is transported through first osmotic membrane 411 when it is transported from retentate side 412 of osmotic membrane 411 to permeate side 414 of osmotic membrane 411.

According to certain embodiments, the osmotic membrane can be configured such that a stream (e.g., the first permeate stream or a portion thereof) can be transported across the facial area of the retentate side of the osmotic membrane. Such transport may be useful, for example, when the osmotic membrane is operated as a co-flow or a counter-flow osmotic membrane separator. Transportation of a stream across the facial area of the first side of the osmotic membrane can be achieved, for example, by arranging an inlet and an outlet such that they span at least a portion of the facial area of the first side of the osmotic membrane. In some such embodiments, when a fluid is transported from the inlet to the outlet, it is transported across at least a portion of the facial area of the first side of the osmotic membrane.

Certain embodiments comprise transporting a first draw inlet stream across the second side of the osmotic membrane of the first osmotic membrane separator. For example, in FIG. 1A, first draw inlet stream 418 can be transported across second side 414 of osmotic membrane 411 of first osmotic membrane separator 410. The first draw inlet stream (e.g., stream 418 in FIG. 4A) can comprise, according to certain embodiments, any component(s) suitable for imparting an appropriate osmotic pressure to perform the osmotic separations described herein. In some embodiments, the draw inlet stream is an aqueous solution comprising one or more solubilized species, such as one or more dissolved ions and/or one or more dissociated molecules. For example, in some embodiments, the draw inlet stream comprises $Na^+$, $Mg^{2+}$, $Ca^{2+}$, $Sr^{2+}$, $Ba^{2+}$, and/or $Cl^-$. In some embodiments, the draw inlet stream comprises at least one solubilized monovalent cation, such as $Na^+$ and/or $K^+$. In certain embodiments, the draw inlet stream comprises at least one solubilized monovalent anion, such as $Cl^-$ and/or $Br^-$. Cations and/or anions having other valencies may also be present in the draw inlet stream. Other species could also be used in the draw stream. For example, in some embodiments, the draw inlet stream can be an aqueous stream comprising a solubilized non-ionic species, such as ammonia ($NH_3$). The draw inlet stream may be prepared, according to certain embodiments, by suspending and/or dissolving one or more species in a solvent, such as an aqueous solvent) to solubilize the species in the solvent. For example, in some embodiments, one or more draw inlet streams can be made by dissolving one or more solid salts in an aqueous solvent. Non-limiting examples of salts that may be dissolved in water include $NaCl$, $CaCl_2$, $MgCl_2$, and the like. In some embodiments, the draw stream can be prepared by mixing ammonia with water.

Certain embodiments comprise applying a hydraulic pressure to the first side of the first osmotic membrane (of the first osmotic membrane separator) such that water is transported from the first permeate stream, through the first osmotic membrane, to the first draw inlet stream to produce a first draw product stream having a lower osmotic pressure than the first draw inlet stream. For example, in FIG. 1A, a hydraulic pressure can be applied to retentate side 412 of osmotic membrane 411 of first osmotic membrane separator 410 such that at least a portion of water from first permeate stream 230 is transported from retentate side 412, through first osmotic membrane 411, to permeate side 414. In some embodiments, water transported through the first osmotic membrane of the first osmotic membrane separator can be combined with the first draw inlet stream to produce a draw product stream. For example, in FIG. 1A, water transported from retentate side 412 to permeate side 414 of first osmotic membrane 411 can be combined with first draw inlet stream 418 to produce first draw product stream 416. The first draw product stream can have a lower osmotic pressure than the first draw inlet stream. For example, in FIG. 1A, first draw product stream 416 can have a lower osmotic pressure than first draw inlet stream 418. In some embodiments, the first draw inlet stream (e.g., stream 418) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the first draw product stream (e.g., stream 416).

In certain embodiments, the first permeate stream has a higher osmotic pressure than the first draw inlet stream, and the first osmotic membrane is operated as a reverse osmosis membrane.

In certain embodiments, at least about 25 wt % (or at least about 50 wt %, at least about 75 wt %, at least about 90 wt %, at least about 95 wt %, at least about 98 wt %, or more) of the water within the first permeate stream portion that is transported to the first side of the first osmotic membrane is transported through the first osmotic membrane to the second side of the first osmotic membrane.

Operation of the first osmotic membrane separator can also produce a monovalent-ion-enriched product stream, which can have a higher osmotic pressure than the first permeate stream from the ion-selective membrane separator. For example, referring to FIG. 1A, operation of first osmotic membrane separator 410 can produce monovalent-ion-enriched product stream 280, which can have a higher osmotic pressure than first permeate stream 230. In some embodiments, the monovalent-ion-enriched product stream (e.g., stream 280) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the first permeate stream (e.g., stream 230).

Certain embodiments comprise transporting at least a portion (e.g., at least about 25 wt %, at least about 50 wt %, at least about 75 wt %, at least about 90 wt %, at least about 95 wt %, at least about 98 wt %, or more) of the first draw product stream (which itself, as described above, may contain at least a portion of the water from the first permeate stream) from the second side of the first osmotic membrane to the second osmotic membrane separator, such that the first draw product stream portion is transported across a first side of the second osmotic membrane. For example, referring to FIG. 1A, certain embodiments comprise transporting at least a portion of first draw product stream 416 across retentate side 422 of second osmotic membrane 421 (of second osmotic membrane separator 420).

Certain embodiments comprise transporting at least a portion of a second draw inlet stream across the second side of the second osmotic membrane (of the second osmotic membrane separator). For example, in FIG. 1A, second draw inlet stream 428 can be transported across permeate side 424 of second osmotic membrane 421 (of second osmotic membrane separator 420). The second draw inlet stream can include solubilized species (e.g., solubilized ion species) that are the same as or different from those present in the first draw inlet stream. In certain embodiments, the osmotic pressure of the first draw inlet stream can be higher than the osmotic pressure of the second draw inlet stream. For example, in some embodiments, the first draw inlet stream (e.g., stream 418) can have an osmotic pressure that is at least about 1.01 times, at least about 1.1 times, at least about 1.5 times, at least about 2 times, or at least about 5 times (and/or, in some embodiments, up to about 10 times, up to about 100 times, up to about 500 times, up to about 1000 times, up to about 5000 times, or more) the osmotic pressure of the second draw inlet stream (e.g., stream 428). In some embodiments, the total molar concentration (in units of molarity) of solubilized species (e.g., solubilized ions) in the second draw inlet stream is lower than the total molar concentration of solubilized species (e.g., solubilized ions) in the first draw inlet stream.

Certain embodiments comprise applying a hydraulic pressure to the first side of the second osmotic membrane (of the second osmotic membrane separator) such that water is transported from the first draw product stream through the second osmotic membrane to the second draw inlet stream to produce a second draw product stream having a lower osmotic pressure than the second draw inlet stream. For example, in FIG. 1A, a hydraulic pressure can be applied to retentate side 422 of second osmotic membrane 421 (of second osmotic membrane separator 420) such that at least a portion of water from first draw product stream 416 is transported from retentate side 422, through second osmotic membrane 421, to permeate side 424. In some embodiments, water transported through the second osmotic membrane can be combined with the second draw inlet stream to produce a second draw product stream. For example, in FIG. 1A, water transported from retentate side 422 to permeate side 424 of second osmotic membrane 421 can be combined with second draw inlet stream 428 to produce second draw product stream 426.

In certain embodiments, the first draw product stream has a higher osmotic pressure than the second draw inlet stream, and the second osmotic membrane is operated as a reverse osmosis membrane.

In certain embodiments, at least about 25 wt % (or at least about 50 wt %, at least about 75 wt %, at least about 90 wt %, at least about 95 wt %, at least about 98 wt %, or more) of the water within the first draw product stream portion that is transported to the first side of the second osmotic membrane is transported through the second osmotic membrane to the second side of the second osmotic membrane.

The second draw product stream can have a lower osmotic pressure than the second draw inlet stream. For example, in FIG. 1A, second draw product stream 426 can have a lower osmotic pressure than second draw inlet stream 428. In some embodiments, the second draw inlet stream (e.g., stream 428) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the second draw product stream (e.g., stream 426).

Operation of the second osmotic membrane separator can also produce a product stream having a higher osmotic pressure than the first draw product stream from the first osmotic membrane separator. For example, referring to FIG. 1A, operation of second osmotic membrane separator 420 can produce product stream 423, which can have a higher osmotic pressure than first draw product stream 416. In some embodiments, the product stream (e.g., stream 423) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the first draw product stream (e.g., stream 416).

Certain embodiments comprise combining at least a portion of the second draw product stream with at least a portion of the first retentate stream. In some embodiments, combining at least a portion of the second draw product stream with at least a portion of the first retentate stream comprises combining at least a portion of the water from the second draw product stream with at least a portion of the first retentate stream. Referring to FIG. 4A stream 430 can include at least a portion of the water within second draw product stream 426. In certain embodiments, stream 430 can be combined with first retentate stream 240 to produce a multivalent-ion-enriched product stream 270.

In some embodiments, combining at least a portion of the second draw product stream with at least a portion of the first retentate stream comprises establishing a direct fluidic connection between at least a portion of the second draw product stream and at least a portion of the first retentate stream. For example, in FIG. 1A, in some embodiments, second draw product stream 426 can be transported directly to stream 430 without being further processed, such that second draw product stream 426 is directly combined with first retentate stream 240 to produce multivalent-ion-enriched product stream 270.

Figure 1B:
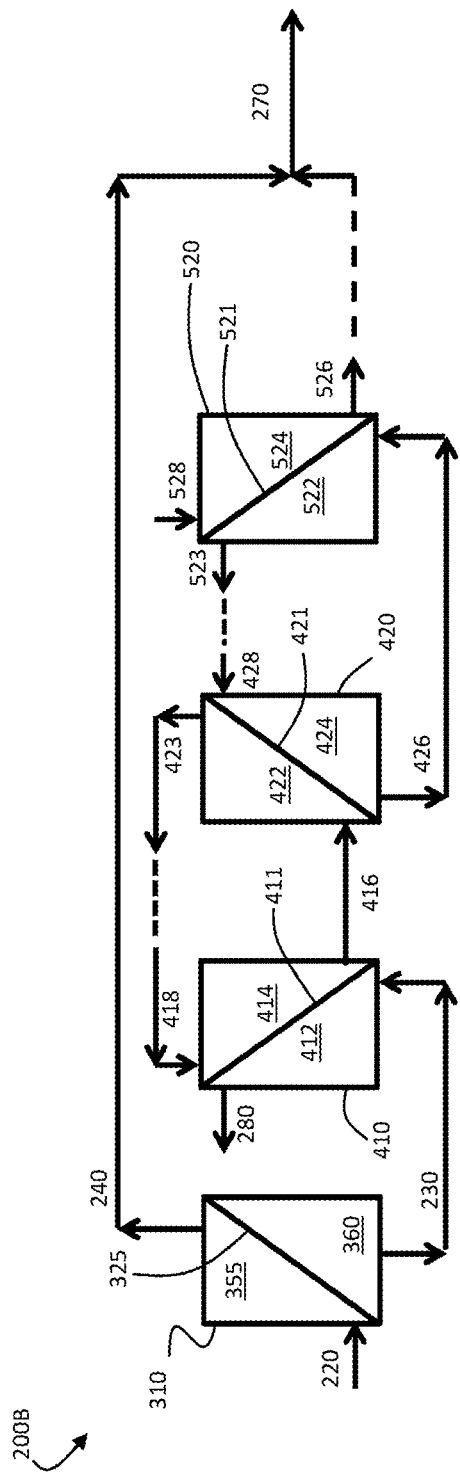
FIG. 1B is a schematic illustration, according to certain embodiments, of a system for producing a multivalent-ion-enriched product stream, comprising an ion-selective membrane separator and at least three osmotic membrane separators.

In some embodiments, combining at least a portion of the second draw product stream with at least a portion of the first retentate stream comprises further processing the second draw product stream prior to combining the portion of the second draw product stream with the portion of the first retentate stream. For example, in certain embodiments, at least a portion of the second draw product stream can be subject to one or more additional osmotic membrane separations. Some such embodiments comprise transporting at least a portion of the second draw product stream to a third osmotic membrane separator. FIG. 1B is a schematic illustration of system 200B, which comprises a third osmotic membrane separator 520. The third osmotic membrane separator can comprise a third osmotic membrane, which can be used to at least partially separate solubilized monovalent ions from water. For example, in FIG. 1B, third osmotic membrane separator 520 comprises osmotic membrane 521, which has a retentate side 522 and a permeate side 524.

Certain embodiments comprise transporting at least a portion of the second draw product stream to the third osmotic membrane (of the third osmotic membrane separator), such that the second draw product stream portion is transported across a first side of the third osmotic membrane. For example, referring to FIG. 1B, certain embodiments comprise transporting at least a portion of second draw product stream 426 to third osmotic membrane 521 (or third osmotic membrane separator 520), such that the second draw product stream 426 is transported across retentate side 522 of third osmotic membrane 521.

Certain embodiments comprise transporting a third draw inlet stream across the second side of the third osmotic membrane (of the third osmotic membrane separator). For example, in FIG. 1B, draw inlet stream 528 can be transported across permeate side 524 of third osmotic membrane 521 (of third osmotic membrane separator 520). The third draw inlet stream can include solubilized species (e.g., solubilized ion species) that are the same as or different from those present in the first draw inlet stream and/or the second draw inlet stream. In certain embodiments, the osmotic pressure of the second draw inlet stream can be higher than the osmotic pressure of the third draw inlet stream. For example, in some embodiments, the second draw inlet stream (e.g., stream 428) can have an osmotic pressure that is at least about 1.01 times, at least about 1.1 times, at least about 1.5 times, at least about 2 times, or at least about 5 times (and/or, in some embodiments, up to about 10 times, up to about 100 times, up to about 500 times, up to about 1000 times, up to about 5000 times, or more) the osmotic pressure of the third draw inlet stream (e.g., stream 528). In some embodiments, the total molar concentration (in units of molarity) of solubilized species (e.g., solubilized ions) in the third draw inlet stream is lower than the total molar concentration of solubilized species (e.g., solubilized ions) in the second draw inlet stream.

Certain embodiments comprise applying a hydraulic pressure to the first side of the third osmotic membrane (of the third osmotic membrane separator) such that water is transported from the second draw product stream through the third osmotic membrane to the third draw inlet stream to produce a third draw product stream having a lower osmotic pressure than the third draw inlet stream. For example, in FIG. 1B, a hydraulic pressure can be applied to retentate side 522 of third osmotic membrane 521 (of third osmotic membrane separator 520) such that at least a portion of water from second draw product stream 426 is transported from retentate side 522, through their osmotic membrane 521, to permeate side 524. In some embodiments, water transported through the third osmotic membrane can be combined with the third draw inlet stream to produce a third draw product stream. For example, in FIG. 1B, water transported from retentate side 522 to permeate side 524 of third osmotic membrane 521 can be combined with third draw inlet stream 528 to produce third draw product stream 526. Because the third draw product stream contains at least a portion of the water from the second draw product stream, subsequent transport of the third draw product stream to another location constitutes transport of a portion of the second draw product stream to that location.

In certain embodiments, the second draw product stream has a higher osmotic pressure than the third draw inlet stream, and the third osmotic membrane is operated as a reverse osmosis membrane.

In certain embodiments, at least about 25 wt % (or at least about 50 wt %, at least about 75 wt %, at least about 90 wt %, at least about 95 wt %, at least about 98 wt %, or more) of the water within the second draw product stream portion that is transported to the first side of the third osmotic membrane is transported through the third osmotic membrane to the second side of the third osmotic membrane.

The third draw product stream can have a lower osmotic pressure than the third draw inlet stream. For example, in FIG. 1B, third draw product stream 526 can have a lower osmotic pressure than third draw inlet stream 528. In some embodiments, the third draw inlet stream (e.g., stream 528) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the third draw product stream (e.g., stream 526).

Operation of the third osmotic membrane separator can also produce a product stream having a higher osmotic pressure than the second draw product stream from the second osmotic membrane separator. For example, referring to FIG. 1B, operation of third osmotic membrane separator 520 can produce product stream 523, which can have a higher osmotic pressure than second draw product stream 426. In some embodiments, the product stream (e.g., stream 523) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the second draw product stream (e.g., stream 426).

In some embodiments, combining at least a portion of the second draw product stream with at least a portion of the first retentate stream comprises combining at least a portion of the third draw product stream (which contains a portion of the water from the second draw product stream) with at least a portion of the first retentate stream. Some embodiments comprise establishing a direct fluidic connection between at least a portion of the third draw product stream and at least a portion of the first retentate stream. For example, in FIG. 1B, in some embodiments, third draw product stream 526 can be transported directly to stream 430 without being further processed, such that third draw product stream 526 is directly combined with first retentate stream 240 to produce multivalent-ion-enriched product stream 270. In other embodiments, combining at least a portion of the third draw product stream (and, thus, a portion of the second draw product stream) with at least a portion of the first retentate stream comprises further processing the third draw product stream (e.g., via additional osmotic membrane separation steps) prior to combining the portion of the third draw product stream with the portion of the first retentate stream.

While two osmotic membrane separators are illustrated in FIG. 1A and three osmotic membrane separators are illustrated in FIG. 1B, additional osmotic membrane separators could be used to serially process draw product streams. For example, in some embodiments, the serial osmotic membrane separation process can include at least 4, at least 5, at least 10, or more serially-connected osmotic membrane separators.

In some embodiments, combining at least a portion of the second draw product stream with at least a portion of the first retentate stream comprises transporting at least a portion (e.g., at least about 25 wt %, at least about 50 wt %, at least about 75 wt %, at least about 90 wt %, at least about 95 wt %, at least about 98 wt %, or more) of the second draw product stream across a first side of the osmotic membrane of an osmotic membrane separator and transporting at least a portion (e.g., at least about 25 wt %, at least about 50 wt %, at least about 75 wt %, at least about 90 wt %, at least about 95 wt %, at least about 98 wt %, or more) of the first retentate stream across a second side of the osmotic membrane of the osmotic membrane separator. For example, referring to system 200C of FIG. 1C, certain embodiments comprise transporting at least a portion of second draw product stream 426 across first side 155 of osmotic membrane 150 of osmotic membrane separator 145 (via stream 430) and transporting at least a portion of first retentate stream 240 across second side 160 of osmotic membrane 150 of osmotic membrane separator 145.

Arranging the system such that a draw product stream is positioned on one side of an osmotic membrane and the first retentate stream (which is enriched in multivalent ions) is positioned on the other side of the osmotic membrane can, according to certain embodiments, enhance the efficiency with which water from the draw product stream is transported into the first retentate stream, relative to the efficiency that could be achieved were water removed from the draw product stream in a standalone osmosis process. In particular, according to certain embodiments, the presence of the multivalent ions on the side of the osmotic membrane opposite the draw product stream can reduce the amount of hydraulic pressure that needs to be applied to the draw product stream (or portion thereof) to achieve a desired level of separation. In addition, arranging the system such that the product draw stream is positioned on one side of the osmotic membrane and the first retentate stream is positioned on the other side of the osmotic membrane can allow one to perform a forward osmosis process, in some cases. For example, in some instances, the presence of the multivalent ions at a relatively high concentration on the side of the osmotic membrane opposite the draw product stream can provide at least a portion of the driving force for performing a forward osmosis process.

In some embodiments, all or a portion of the second draw product stream can be transported directly to the first side of the osmotic membrane of the osmotic separator to which the portion of the first retentate stream is transported. For example, in FIG. 1C, all or a portion of second draw product stream 426 can be transported directly to first side 155 of osmotic membrane 150 of osmotic membrane separator 145, in which case inlet stream 430 corresponds to second draw product stream 426. In other embodiments, one or more additional osmotic membrane separators may be used to process second draw product stream 426, in which case, inlet stream 430 could contain a portion of the water within second draw product stream 426, but would not be directly fluidically connected to second draw product stream 426.

According to certain embodiments, at least a portion (e.g., at least about 25 wt %, at least about 50 wt %, at least about 75 wt %, at least about 90 wt %, at least about 95 wt %, at least about 98 wt %, or more) of the water in the second draw product stream is transported across a first side of the osmotic membrane of the osmotic membrane separator to which the portion of the first retentate stream is transported. For example, in FIG. 1C, the portion of second draw product stream 426 that is transported across first side 155 of osmotic membrane 150 of osmotic membrane separator 145 can contain at least a portion of the water from second draw product stream 426 that is transported out of second osmotic membrane separator 420.

In some such embodiments, at least a portion (e.g., at least about 25 wt %, at least about 50%, at least about 75%, at least about 90%, at least about 95%, at least about 98%, or more, on a molar basis) of a solubilized species (e.g., an ion or non-ion solubilized species) within the second draw product stream is transported across a first side of the osmotic membrane of the osmotic membrane separator to which the portion of the first retentate stream is transported. For example, in FIG. 1C, the portion of second draw product stream 426 that is transported across first side 155 of osmotic membrane 150 of osmotic membrane separator 145 can contain at least a portion of a solubilized species present within second draw product stream 426 that is transported out of second osmotic membrane separator 420. It may not be necessary in all embodiments, however, to transport solubilized species from the second draw product stream across the first side of the osmotic membrane separator that is used to transport water into the first retentate stream portion. For example, in some embodiments, the solubilized species within the draw product stream may be (although they need not necessarily be) completely separated from the water within the second draw product stream (e.g., using one or more additional osmotic membrane separators) prior to transporting the portion of the water from the second draw product stream across the osmotic membrane that is used to transport water into at least a portion of the first retentate stream.

Certain embodiments comprise transporting at least a portion (e.g., at least about 25 wt %, at least about 50 wt %, at least about 75 wt %, at least about 90 wt %, at least about 95 wt %, at least about 98 wt %, or more) of the first retentate stream across a second side of the osmotic membrane of the osmotic membrane separator such that at least a portion (e.g., at least about 25 wt %, at least about 50 wt %, at least about 75 wt %, or more) of the water from the second draw product stream is transported through the osmotic membrane and into the first retentate stream (or a portion thereof). For example, in FIG. 1C, at least a portion of first retentate stream 240 can be transported across second side 160 of osmotic membrane 150 of osmotic membrane separator 145 such that at least a portion of the water from second draw product stream 426 is transported through osmotic membrane 150 (from first side 155 to second side 160) and into first retentate stream 240.

In some embodiments, operation of the osmotic membrane separator within which water is added to at least a portion of the first retentate stream generates a stream existing the first side of the osmotic membrane and having a higher osmotic pressure than the stream fed to the first side of the osmotic membrane. For example, referring to FIG. 1C, in some embodiments, operation of osmotic membrane separator 145 (within which water is added to first retentate stream 240) generates stream 132 existing first side 155 of osmotic membrane 150 and having a higher osmotic pressure than stream 430 fed to first side 155 of osmotic membrane 150. In some such embodiments, the product stream from the first side of the osmotic membrane separator (e.g., stream 132) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the draft product stream fed to the first side of the osmotic membrane separator (e.g., stream 430)

According to certain embodiments, less than about 5% (or, in some embodiments, less than about 2%, less than about 1%, or less than about 0.1%, on a molar basis) of the solubilized species within a draw product stream are transported through the osmotic membrane during operation of the osmotic membrane separator used to add water to the first retentate stream. For example, referring to FIG. 1C, in some embodiments, less than 5% of the solubilized species within stream 430 (which may originate from, for example, second draw product stream 426 or the draw product stream of another osmotic membrane separator) are transported from first side 155 of osmotic membrane 150 to second side 160 of osmotic membrane 150 during operation of osmotic membrane separator 145. In some embodiments, less than about 5% (or, in some embodiments, less than about 2%, less than about 1%, or less than about 0.1%, on a molar basis) of the solubilized multivalent ions within the first retentate stream are transported through the osmotic membrane during operation of the osmotic membrane separator. For example, referring to FIG. 1C, in some embodiments, less than 5% of the solubilized multivalent ions within first retentate stream 240 are transported from second side 160 of osmotic membrane 150 to first side 155 of osmotic membrane 150 during operation of osmotic membrane separator 145.

Figure 1C:
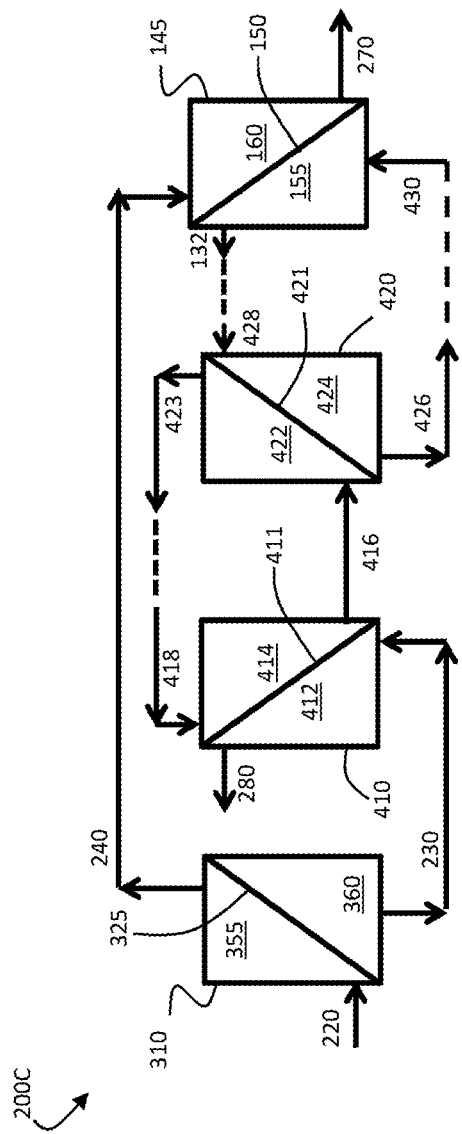
FIG. 1C is a schematic illustration, according to some embodiments, of a system for producing a multivalent-ion-enriched product stream in which an osmotic membrane separator is used to combine at least a portion of a draw product stream from an osmotic membrane separator with at least a portion of a first retentate stream from an ion-selective membrane separator.

The osmotic membrane separator in which at least a portion of the second draw product stream is combined with at least a portion of the first retentate stream (e.g., osmotic membrane separator 145 in FIG. 1C) can be used to perform, according to certain embodiments, a reverse osmosis process. As noted above, reverse osmosis generally occurs when the osmotic pressure on the retentate side of the osmotic membrane is greater than the osmotic pressure on the permeate side of the osmotic membrane, and a hydraulic pressure is applied to the first side of the osmotic membrane such that the hydraulic pressure on the retentate side of the osmotic membrane is sufficiently greater than the hydraulic pressure on the permeate side of the osmotic membrane to cause water to be transported from the retentate side of the osmotic membrane to the permeate side of the osmotic membrane. Operating the osmotic membrane separator to perform reverse osmosis can comprise applying a hydraulic pressure to the retentate side of the osmotic membrane of the osmotic membrane separator. Referring to FIG. 1C, for example, osmotic membrane separator 145 can be used to perform reverse osmosis, for example, when the osmotic pressure on first side 155 of osmotic membrane separator 145 is higher than the osmotic pressure on second side 160, a hydraulic pressure is applied to first side 155 such that the hydraulic pressure on first side 155 is higher than the hydraulic pressure on second side 160, and the difference between the hydraulic pressure on first side 155 and the hydraulic pressure on second side 160 is greater than the difference between the osmotic pressure on first side 155 and the osmotic pressure on second side 160. In such cases, water can be transported from first side 155 of osmotic membrane 150 to second side 160 of osmotic membrane 150.

In certain embodiments, the osmotic membrane separator in which at least a portion of the second draw product stream is combined with at least a portion of the first retentate stream (e.g., osmotic membrane separator 145 in FIG. 1C) can be used to perform forward osmosis. As noted above, forward osmosis generally occurs when the osmotic pressure on the permeate side of the osmotic membrane is greater than the osmotic pressure on the retentate side of the osmotic membrane such that water is transported from the retentate side of the osmotic membrane to the permeate side of the osmotic membrane. Referring to FIG. 1C, in some embodiments, the osmotic membrane separator 145 can be used to perform forward osmosis, for example, when the osmotic pressure on second side 160 of osmotic membrane 150 is greater than the osmotic pressure on first side 155 of osmotic membrane 150, and when the hydraulic pressure gradient from second side 160 to first side 155 ($P_{160}$–$P_{155}$) is not large enough to overcome the difference in the osmotic pressure between first side 155 and second side 160. In such cases, water can be transported from first side 155 of osmotic membrane 150 to second side 160 of osmotic membrane 150.

In some cases, hydraulic pressure may be applied to the retentate side of the osmotic membrane separator in which at least a portion of the second draw product stream is combined with at least a portion of the first retentate stream (e.g., osmotic membrane separator 145 in FIG. 1C), to enhance the forward osmosis process. For example, in some instances in which the stream on the first side of the osmotic membrane has a lower osmotic pressure than the stream on the second side of the osmotic membrane, a hydraulic pressure may be applied to the first side of the osmotic membrane such that the hydraulic pressure of the stream on the first side of the osmotic membrane is higher than the hydraulic pressure of the stream on the second side of the osmotic membrane. The applied pressure can increase the rate at which water is transported from the first side of the osmotic membrane to the second side of the osmotic membrane. Such arrangements are sometimes referred to herein as pressure-assisted forward osmosis (which is a particular type of forward osmosis). Referring to FIG. 1C, for example, osmotic membrane separator 145 can be used to perform pressure assisted forward osmosis, for example, by applying a hydraulic pressure to first side 155 of osmotic membrane 150 such that the hydraulic pressure of the stream on first side 155 of osmotic membrane 150 is higher than the hydraulic pressure of the stream on second side 160 of osmotic membrane 150. Of course, the use of an applied pressure to enhance forward osmosis is not generally required, and in some embodiments, forward osmosis is performed in the substantial absence of an applied pressure (e.g., such that the hydraulic pressure gradient through the osmotic membrane is less than or equal to about 0.1 bar).

Generally, whether the osmotic membrane separator in which at least a portion of the second draw product stream is combined with at least a portion of the first retentate stream (e.g., osmotic membrane separator 145 in FIG. 1C) is used to perform reverse osmosis or forward osmosis is determined by the osmotic pressures of these streams on either side of the osmotic membrane of the osmotic membrane separator. For example, referring to FIG. 1C, according to certain embodiments, if the osmotic pressure on first side 155 of osmotic membrane 150 is higher than the osmotic pressure on second side 160 of osmotic membrane 150, and transport of water from first side 155 to second side 160 is desired, reverse osmosis will be performed. On the other hand, in some embodiments, the osmotic pressure on first side 155 of osmotic membrane 150 may be lower than the osmotic pressure on second side 160 of osmotic membrane 150, and transport of water from first side 155 to second side 160 may be desired, in which case, forward osmosis (pressure assisted or otherwise) may be performed.

According to certain embodiments, streams within the system can be recycled. For example, in certain embodiments, at least a portion of the product stream from the first side of the second osmotic membrane separator is recycled to the second side of the first osmotic membrane separator. For example, in FIGS. 1A-1C, in some embodiments, at least a portion of product stream 423 is transported to second side 414 of first osmotic membrane separator 410 via draw inlet stream 418. In certain embodiments, at least a portion of the product stream from the first side of the third osmotic membrane separator is recycled to the second side of the second osmotic membrane separator. For example, in FIG. 1B, in some embodiments, at least a portion of product stream 523 is transported to second side 424 of second osmotic membrane separator 420 via second draw inlet stream 428. According to certain embodiments, at least a portion of the product stream from the first side of the osmotic membrane separator in which water is added to the first retentate stream is recycled to the second side of the second osmotic membrane separator. For example, in FIG. 1C, in some embodiments, at least a portion of product stream 132 is transported to second side 424 of second osmotic membrane separator 420 via second draw inlet stream 428.

One advantage of certain, although not necessarily all, embodiments is that one or more of the osmotic-membrane-based separation steps can be performed to achieve a desired degree of separation while using relatively low transmembrane osmotic pressure gradients. Such low transmembrane osmotic pressure gradients can be advantageous, for example, in certain cases in which reverse osmosis is used to perform separations, as relatively low transmembrane osmotic pressure gradients can allow one to perform separations using relatively low applied hydraulic pressures, thus potentially reducing energy requirements and/or equipment costs compared to higher hydraulic pressure applications. In some embodiments, at at least one location on the osmotic membrane of the osmotic membrane separator, the difference between an osmotic pressure on a first side of the first osmotic membrane and an osmotic pressure on a second side of the first osmotic membrane (i.e., opposite the first side of the first osmotic membrane) is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). For example, in FIGS. 1A-1C, in some embodiments, at at least one location on osmotic membrane 411, the difference between an osmotic pressure on first side 412 of osmotic membrane 411 and an osmotic pressure on second side 414 of osmotic membrane 411 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). As another example, in FIGS. 1A-1C, in some embodiments, at at least one location on osmotic membrane 421, the difference between an osmotic pressure on first side 422 of osmotic membrane 421 and an osmotic pressure on second side 424 of osmotic membrane 421 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). As yet another example, in FIG. 1B, in some embodiments, at at least one location on osmotic membrane 521, the difference between an osmotic pressure on first side 522 of osmotic membrane 521 and an osmotic pressure on second side 524 of osmotic membrane 521 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). As yet another example, in FIG. 1C, in some embodiments, at at least one location on osmotic membrane 150, the difference between an osmotic pressure on first side 155 of osmotic membrane 150 and an osmotic pressure on second side 160 of osmotic membrane 150 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

According to certain embodiments, the transmembrane osmotic pressure gradient spatially-averaged across the facial area of one or more of the osmotic membranes (e.g., such as osmotic membrane 411 and/or 421 in FIGS. 1A-1C; osmotic membrane 521 in FIG. 1B; and/or osmotic membrane 150 in FIG. 1C)) is relatively small. The spatially-averaged transmembrane osmotic pressure gradient across a facial area of a particular osmotic membrane can be calculated by measuring the osmotic pressure at all points along the facial area of the first side of the osmotic membrane, measuring the osmotic pressure at all points along the facial area of the second side of the osmotic membrane, and calculating the two-dimensional distribution (across the facial area of the membrane) of the transmembrane osmotic pressure gradient (by subtracting, at each point across the facial area of the osmotic membrane, the osmotic pressure on the second side of the osmotic membrane from the osmotic pressure on the opposite point on the first side of the osmotic membrane). One can then spatially average the two-dimensional distribution of the transmembrane osmotic pressure gradient. In certain embodiments, the transmembrane osmotic pressure gradient, spatially-averaged across the facial area of the membrane, for one or more of the osmotic membranes within the system is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

Achieving a relatively low spatially-averaged transmembrane osmotic pressure gradient across a facial area of an osmotic membrane can be achieved, for example, by controlling the osmotic pressure of the streams fed to either side of the osmotic membrane (e.g., by controlling salt types and/or salt concentrations within the streams).

According to certain embodiments, the difference between the osmotic pressure within the first permeate stream fed to the first osmotic membrane separator and the osmotic pressure within the first draw product stream is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). In certain embodiments, the difference between the osmotic pressure of the first draw product stream and the osmotic pressure of the second draw product stream is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

According to certain embodiments, the streams on either side of an osmotic membrane can be operated in counter-current configuration. Operation of the osmotic membrane separators in this manner can, according to certain but not necessarily all embodiments, allow for more efficient operation of the osmotic membrane separator. In FIGS. 1A-1C, each of osmotic membrane separators 410, 420, 521, and 145 are illustrated as being operated in counter-current configuration. It should be understood that two streams do not have to be transported in perfectly parallel and opposite directions to be considered to be in counter-current configuration, and in some embodiments, the primary flow directions of two streams that are in a counter-current flow configuration can form an angle of up to about 10° (or, in some cases, up to about 5°, up to about 2°, or up to about 1°). In certain embodiments, the streams on either side of osmotic membrane 411 (in FIGS. 1A-1C), osmotic membrane 421 (in FIGS. 1A-1C), osmotic membrane 521 (in FIG. 1B), and/or osmotic membrane 150 (in FIG. 1C) are transported across the osmotic membrane in a counter-current configuration.

It should be understood that, where a single membrane is shown or described, such single membranes could be replaced with multiple, parallel-connected membranes. The use of multiple, parallel-connected membranes can, for example, increase the capacity of the system.

As noted above, according to certain embodiments, combining at least a portion of the second draw product stream with at least a portion of the first retentate stream can produce a multivalent-ion-enriched product stream. For example, referring to FIGS. 1A-1C, combining at least a portion of the water within second draw product stream 426 with at least a portion of first retentate stream 240 produces multivalent-ion-enriched product stream 270.

In some embodiments, a relatively large percentage of the solubilized multivalent ions from the aqueous feed stream is present in the multivalent-ion-enriched product stream. For example, in some embodiments, the multivalent-ion-enriched product stream contains at least about 75% (or at least about 85%, at least about 90%, at least about 95%, or at least about 99%, on a molar basis) of the solubilized multivalent ions from the aqueous feed stream. For example, in FIGS. 1A-1C, multivalent-ion-enriched product stream 270 can contain at least about 75% (or at least about 85%, at least about 90%, at least about 95%, or at least about 99%, on a molar basis) of the solubilized multivalent ions from aqueous feed stream 220.

Transporting at least a portion of the first permeate stream through the first osmotic membrane separator can produce a monovalent-ion-enriched product stream. For example, referring to FIGS. 1A-1C, transporting at least a portion of the water in first permeate stream 230 through osmotic membrane separator 410 produces monovalent-ion-enriched product stream 280.

In some embodiments, the amount of solubilized monovalent ions within the monovalent-ion-enriched product stream is relatively high. For example, in some embodiments, the monovalent-ion-enriched product stream contains at least about 75% (or at least about 85%, at least about 90%, at least about 95%, or at least about 99%, on a molar basis) of the solubilized monovalent ions from the aqueous feed stream. For example, in FIGS. 1A-1C, monovalent-ion-enriched product stream 280 can contain at least about 75% (or at least about 85%, at least about 90%, at least about 95%, or at least about 99%, on a molar basis) of the solubilized monovalent ions from aqueous feed stream 220.

According to certain embodiments, the multivalent-ion-enriched product stream can contain a relatively high amount of solubilized multivalent ions and a relatively low amount of solubilized monovalent ions. For example, in some embodiments, the ratio of solubilized multivalent ions within the multivalent-ion-enriched product stream to solubilized monovalent ions within the multivalent-ion-enriched product stream is at least about 3:1, at least about 5:1, at least about 10:1, at least about 50:1, at least about 100:1, at least about 1000:1, at least about 10,000:1, or more. For example, in FIGS. 1A-1C, the ratio of solubilized multivalent ions within multivalent-ion-enriched product stream 270 to solubilized monovalent ions within multivalent-ion-enriched product stream 270 is at least about 3:1, at least about 5:1, at least about 10:1, at least about 50:1, at least about 100:1, at least about 1000:1, at least about 10,000:1, or more.

According to certain embodiments, the ratio of solubilized multivalent ions within multivalent-ion-enriched stream to multivalent ions within the monovalent-ion-enriched product stream is at least about 3:1, at least about 5:1, at least about 10:1, at least about 50:1, at least about 100:1, at least about 1000:1, at least about 10,000:1, or more. For example, in FIGS. 1A-1C, the ratio of solubilized multivalent ions within multivalent-ion-enriched stream 270 to solubilized multivalent ions within monovalent-ion-enriched product stream 280 is at least about 3:1, at least about 5:1, at least about 10:1, at least about 50:1, at least about 100:1, at least about 1000:1, at least about 10,000:1, or more.

In certain embodiments, the total concentration of solubilized multivalent ions in the multivalent-ion-enriched product stream is at least about 60,000 ppm, at least about 80,000 ppm, or at least about 100,000 ppm (and/or, in some embodiments, up to about 500,000 ppm, or more). Multivalent-ion-enriched product streams with solubilized multivalent ion concentrations outside these ranges could also be produced. For example, in some embodiments, the total concentration of solubilized multivalent ions in the multivalent-ion-enriched product stream is as little as 10,000 ppm, 1000 ppm, 100 ppm, or less.

According to certain embodiments, the monovalent-ion-enriched product stream can contain a relatively high amount of solubilized monovalent ions and a relatively low amount of solubilized multivalent ions. For example, in some embodiments, the ratio of solubilized monovalent ions within monovalent-ion-enriched product stream to solubilized multivalent ions within the monovalent-ion-enriched product stream is at least about 3:1, at least about 5:1, at least about 10:1, at least about 50:1, at least about 100:1, at least about 1000:1, at least about 10,000:1, or more. For example, in FIGS. 1A-1C, the ratio of solubilized monovalent ions within monovalent-ion-enriched product stream 280 to solubilized multivalent ions within monovalent-ion-enriched product stream 280 is at least about 3:1, at least about 5:1, at least about 10:1, at least about 50:1, at least about 100:1, at least about 1000:1, at least about 10,000:1, or more.

In some embodiments, the ratio of monovalent ions within the monovalent-ion-enriched product stream to solubilized monovalent ions within the multivalent-ion-enriched product stream is at least about 3:1, at least about 5:1, at least about 10:1, at least about 50:1, at least about 100:1, at least about 1000:1, at least about 10,000:1, or more. For example, in FIGS. 1A-1C, the ratio of solubilized monovalent ions within monovalent-ion-enriched product stream 280 to solubilized monovalent ions within multivalent-ion-enriched product stream 270 is at least about 3:1, at least about 5:1, at least about 10:1, at least about 50:1, at least about 100:1, at least about 1000:1, at least about 10,000:1, or more.

In certain embodiments, the total concentration of solubilized monovalent ions in the monovalent-ion-enriched product stream is at least about 60,000 ppm, at least about 80,000 ppm, or at least about 100,000 ppm (and/or, in some embodiments, up to about 500,000 ppm, or more). Monovalent-ion-enriched product streams with solubilized monovalent ion concentrations outside these ranges could also be produced. For example, in some embodiments, the total concentration of solubilized monovalent ions in the monovalent-ion-enriched product stream is as little as 10,000 ppm, 1000 ppm, 100 ppm, or less.

In some embodiments, a relatively large percentage of the water from the aqueous feed stream is present in the multivalent-ion-enriched product stream. For example, in certain embodiments, multivalent-ion-enriched product stream contains at least about 75 wt % (or at least about 85 wt %, at least about 90 wt %, at least about 95 wt %, or at least about 99 wt %) of the water from the aqueous feed stream. For example, in FIGS. 1A-1C, multivalent-ion-enriched product stream 270 can contain at least about 75 wt % (or at least about 85 wt %, at least about 90 wt %, at least about 95 wt %, or at least about 99 wt %) of the water from aqueous feed stream 220.

In some embodiments, at least a portion of the energy used to pressurize one or more streams (e.g., for performing reverse osmosis) is recovered from the system. The recovered energy may be used, for example, to heat and/or pressurize another stream within the desalination system. Certain embodiments comprise, for example, increasing the pressure of the aqueous feed stream, before the aqueous feed stream is transported into the ion-selective separator, using at least a portion of the pressure of at least one retentate product stream from an osmotic membrane separator.

Energy from a pressurized stream can be recovered via any suitable method. For example, in some embodiments, a pressure exchange device can be used to recover energy from a pressurized stream. Those of ordinary skill in the art are familiar with pressure exchange devices, in which pressure energy from a high pressure fluid stream is transferred to a low pressure fluid stream. An exemplary type of pressure exchange device is a rotary pressure exchanger, for example, as described in U.S. Pat. No. 7,306,437. For example, in some embodiments, energy (e.g., as direct hydraulic pressure) can be recovered by directly contacting a pressurized stream with a stream at a lower pressure, such that the lower pressure stream is pressurized and the higher pressure stream is depressurized (e.g., throttled). Energy can also be recovered in the system using other devices such as, for example, a turbine (e.g., a Pelton wheel).

As noted above, certain embodiments comprise reducing the pressure of at least one retentate product stream from an osmotic membrane separator. For example, some embodiments comprise, after transporting at least a portion of the monovalent-ion-enriched stream across an osmotic membrane, reducing a pressure of the monovalent-ion-enriched product stream. For example, referring to FIG. 1A-1C, in some embodiments, after transporting at least a portion of first permeate stream 230 across retentate side 412 of osmotic membrane 411 to produce monovalent-ion-enriched product stream 280, the pressure of the monovalent-ion-enriched product stream 280 can be reduced. As another example, in some embodiments, after transporting at least a portion of first draw product stream 416 across retentate side 422 of second osmotic membrane 421, the pressure of product stream 423 can be reduced. As another example, referring to FIG. 1B, in some embodiments, after transporting at least a portion of second draw product stream 426 across retentate side 522 of osmotic membrane 521, the pressure of stream 523 can be reduced. As yet another example, referring to FIG. 1C, in some embodiments, after transporting at least a portion of stream 430 across retentate side 155 of osmotic membrane 150, the pressure of stream 132 can be reduced.

Figure 2:
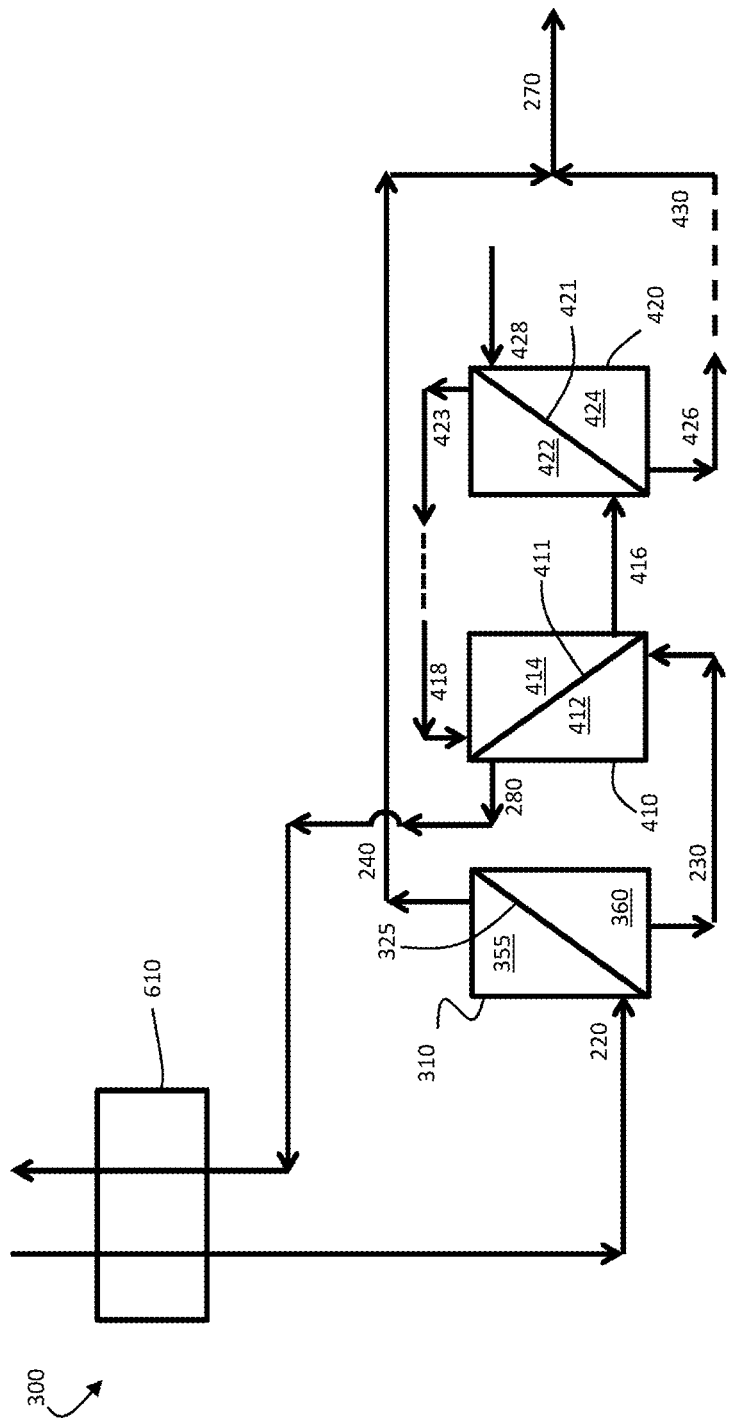
FIG. 2 is a schematic illustration of a system for producing a multivalent-ion-enriched product stream, according to certain embodiments, comprising a pressure recovery device used to pressurize an aqueous feed stream.

Certain embodiments comprise recovering at least a portion of the energy released by reducing the pressure of at least one retentate product stream from an osmotic membrane separator. The recovered energy can be used, according to certain embodiments, to increase the pressure of at least one inlet stream to the retentate side of an ion-selective membrane separator and/or to increase the pressure of at least one inlet stream to the retentate side of an osmotic membrane separator. For example, in some embodiments, the recovered energy is used to increase the pressure of the aqueous feed stream before it is transported into the ion-selective separator. For example, referring to FIGS. 1A-1C, in some embodiments, at least a portion of the energy released by reducing the pressure of a retentate product stream from an osmotic membrane separator can be used to pressurize aqueous feed stream 220. FIG. 2 is a schematic illustration of system 300, which includes one example of such pressurization. In FIG. 2, for example, pressure exchange device 610 is used to recover pressure from stream 280 and to pressurize aqueous feed stream 220 before aqueous feed stream 220 is transported into inlet ion-selective membrane separator 310.

The systems and methods described herein can be used to process a variety of aqueous feed streams. As noted above, the aqueous feed stream fed to the system generally contains both solubilized monovalent ions and solubilized multivalent ions. For example, referring to FIGS. 1A-1C, aqueous feed stream 220 can comprise at least one solubilized monovalent ion species and at least one solubilized multivalent ion species. As another example, referring to FIGS. 2, 3, and 4A-4B, aqueous feed stream 220 can comprise at least one solubilized monovalent ion species and at least one solubilized multivalent ion species. The solubilized ion(s) may originate, for example, from a salt that has been dissolved in the aqueous stream. A solubilized ion is generally an ion that has been solubilized to such an extent that the ion is no longer ionically bonded to a counter-ion. The aqueous feed stream can comprise any of a number of solubilized ion species including, but not limited to, $Na^+$, $Mg^{2+}$, $Ca^{2+}$, $Sr^{2+}$, $Ba^{2+}$, $Cl^-$, carbonate anions, bicarbonate anions, sulfate anions, bisulfate anions, and/or dissolved silica. In some embodiments, the aqueous feed stream comprises at least one solubilized monovalent cation (i.e., a cation with a redox state of +1 when solubilized). For example, in some embodiments, the aqueous feed stream comprises $Na^+$ and/or $K^+$. In certain embodiments, the aqueous feed stream comprises at least one solubilized monovalent anion (i.e., an anion having redox state of −1 when solubilized). For example, in some embodiments, the aqueous feed stream comprises $Cl^-$ and/or $Br^-$. In some embodiments, the aqueous feed stream comprises at least one solubilized monovalent cation and at least one solubilized monovalent anion. In some embodiments, the aqueous feed stream comprises one or more divalent cations (i.e., a cation with a redox state of +2 when solubilized) and/or one or more divalent anions (i.e., an anion with a redox state of −2 when solubilized). In certain embodiments, the aqueous feed stream comprises at least one of $Mg^{2+}$, $Ca^{2+}$, $Sr^{2+}$, $Ba^{2+}$, and sulfate anions. In some embodiments, the aqueous feed stream comprises at least one of $Mg^{2+}$, $Ca^{2+}$, and sulfate anions. Cations and/or anions having other valencies may also be present in the aqueous feed stream, in some embodiments.

In some embodiments, the total concentration of solubilized ions in the aqueous feed stream fed to the system (e.g., stream 220) can be relatively high. As noted elsewhere, one advantage associated with certain embodiments is that initial aqueous feed streams with relatively high solubilized ion concentrations can be desalinated without the use of energy intensive desalination methods.

In certain embodiments, the total concentration of solubilized ions in the aqueous feed stream transported to the ion-selective membrane separator is at least about 60,000 ppm, at least about 80,000 ppm, or at least about 100,000 ppm (and/or, in some embodiments, up to about 500,000 ppm, or more). Aqueous feed streams with solubilized ion concentrations outside these ranges could also be used. For example, in some embodiments, the total concentration of solubilized ions in the aqueous feed stream transported to the ion-selective membrane separator is as little as 10,000 ppm, 1000 ppm, 100 ppm, or less.

In certain embodiments, the total concentration of solubilized monovalent ions in the aqueous feed stream transported to the ion-selective membrane separator is at least about 60,000 ppm, at least about 80,000 ppm, or at least about 100,000 ppm (and/or, in some embodiments, up to about 500,000 ppm, or more). Aqueous feed streams with solubilized monovalent ion concentrations outside these ranges could also be used. For example, in some embodiments, the total concentration of solubilized monovalent ions in the aqueous feed stream transported to the ion-selective membrane separator is as little as 10,000 ppm, 1000 ppm, 100 ppm, or less.

In certain embodiments, the total concentration of solubilized multivalent ions in the aqueous feed stream transported to the ion-selective membrane separator is at least about 60,000 ppm, at least about 80,000 ppm, or at least about 100,000 ppm (and/or, in some embodiments, up to about 500,000 ppm, or more). Aqueous feed streams with solubilized multivalent ion concentrations outside these ranges could also be used. For example, in some embodiments, the total concentration of solubilized multivalent ions in the aqueous feed stream transported to the ion-selective membrane separator is as little as 10,000 ppm, 1000 ppm, 100 ppm, or less.

In certain embodiments, the total concentration of solubilized monovalent ions in the first permeate stream exiting the ion-selective membrane separator is at least about 60,000 ppm, at least about 80,000 ppm, or at least about 100,000 ppm (and/or, in some embodiments, up to about 500,000 ppm, or more). Monovalent-ion-enriched streams with solubilized monovalent ion concentrations outside these ranges could also be used. For example, in some embodiments, the total concentration of solubilized monovalent ions in the monovalent-ion-enriched stream exiting the ion-selective membrane separator is as little as 10,000 ppm, 1000 ppm, 100 ppm, or less.

In certain embodiments, the total concentration of solubilized multivalent ions in the first retentate stream exiting the ion-selective membrane separator is at least about 60,000 ppm, at least about 80,000 ppm, or at least about 100,000 ppm (and/or, in some embodiments, up to about 500,000 ppm, or more). Multivalent-ion-enriched streams with solubilized multivalent ion concentrations outside these ranges could also be used. For example, in some embodiments, the total concentration of solubilized multivalent ions in the first retentate stream exiting the ion-selective membrane separator is as little as 10,000 ppm, 1000 ppm, 100 ppm, or less.

In some embodiments, the aqueous feed stream can be derived from seawater, ground water, brackish water, and/or the effluent of a chemical process. In the oil and gas industry, for example, one type of aqueous feed stream that may be encountered is produced water (e.g., water that emerges from oil or gas wells along with the oil or gas). Due to the length of time produced water has spent in the ground, and due to high subterranean pressures and temperatures that may increase the solubility of certain salts and minerals, produced water often comprises relatively high concentrations of dissolved salts and minerals. For example, some produced water streams may comprise a supersaturated solution of dissolved strontium sulfate ($SrSO_4$). In contrast, another type of aqueous feed stream that may be encountered in the oil and gas industry is flowback water (e.g., water that is injected as a fracking fluid during hydraulic fracturing operations and subsequently recovered). Flowback water often comprises a variety of constituents used in fracking, including surfactants, proppants, and viscosity reducing agents, but often has a lower salinity than produced water. In some cases, the systems and methods described herein can be used to produce multivalent-ion-enriched streams from aqueous feed streams comprising and/or derived from such process streams.

According to certain embodiments, the aqueous feed stream comprises a suspended and/or emulsified immiscible phase. Generally, a suspended and/or emulsified immiscible phase is a material that is not soluble in water to a level of more than 10% by weight at the temperature and other conditions at which the stream is operated. In some embodiments, the suspended and/or emulsified immiscible phase comprises oil and/or grease. The term "oil" generally refers to a fluid that is more hydrophobic than water and is not miscible or soluble in water, as is known in the art. Thus, the oil may be a hydrocarbon in some embodiments, but in other embodiments, the oil may comprise other hydrophobic fluids. In some embodiments, at least about 0.1 wt %, at least about 1 wt %, at least about 2 wt %, at least about 5 wt %, or at least about 10 wt % (and/or, in some embodiments, up to about 20 wt %, up to about 30 wt %, up to about 40 wt %, up to about 50 wt %, or more) of the aqueous feed stream is made up of a suspended and/or emulsified immiscible phase.

It can be undesirable, according to certain embodiments, to allow certain suspended and/or emulsified immiscible phases to enter the system. For example, in certain embodiments in which ion-selective membranes are employed, the membranes can be made of a material (e.g., polysulfones, polyethersulfone) that can be damaged when exposed to oil and/or other hydrocarbons. Osmotic membranes can also be damaged when exposed to such chemicals. Accordingly, removal of the oil and/or other hydrocarbons upstream of the system can be desirable.

Accordingly, certain embodiments comprise removing at least a portion of a suspended or emulsified immiscible phase from the aqueous feed stream before the aqueous feed stream is transported to an ion-selective membrane separator. In certain embodiments, the system is configured such that little or none of the suspended and/or emulsified immiscible phase is transported to the ion-selective membrane separator.

Figure 3:
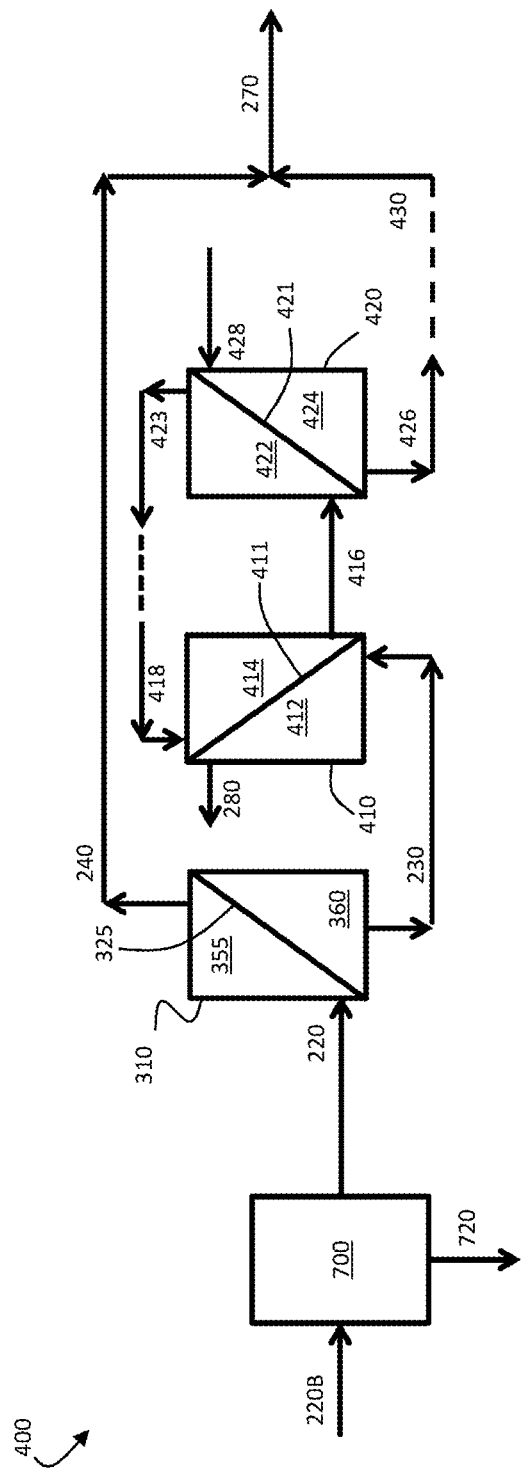
FIG. 3 is, according to some embodiments, a schematic illustration of a system for producing a multivalent-ion-enriched product stream, comprising a water-immiscible phase separator.

For example, in some embodiments, a water-immiscible phase separator can be configured to remove at least a portion of (e.g., at least about 50%, at least about 75 wt %, at least about 90 wt %, at least about 95 wt %, at least about 99 wt %, or more) of the suspended and/or emulsified immiscible phase from the aqueous feed stream before the aqueous feed stream is transported to the ion-selective membrane separator. FIG. 3 is an exemplary schematic illustration of a system 400 in which water-immiscible phase separator 700 is used to remove at least a portion of a suspended and/or emulsified immiscible phase from aqueous feed stream 220B to produce aqueous feed stream 220. The water-immiscible phase separator illustrated in FIG. 3 can be used, for example, to remove at least a portion of the suspended and/or emulsified immiscible phase before the aqueous feed stream is transported to any of the systems illustrated in FIGS. 1A-1C and 2.

In certain embodiments, the water-immiscible phase separator can be configured to output an aqueous feed stream (e.g., to an ion-selective membrane separator) having a concentration of suspended and/or emulsified immiscible phase(s) of less than about 10 ppm, less than about 1 ppm, or less than about 0.1 ppm. In certain embodiments, the water-immiscible phase separator can be configured to output an aqueous feed stream (e.g., to an ion-selective membrane separator) having a concentration of oil of less than about 10 ppm, less than about 1 ppm, or less than about 0.1 ppm.

Optionally, the water-immiscible phase separator can produce an immiscible-phase-rich stream, which can contain at least a portion (or all) of the immiscible phase that is separated from the aqueous feed stream. For example, in FIG. 3, water-immiscible phase separator 700 can produce optional immiscible-phase-rich stream 720, according to certain embodiments.

While the water-immiscible phase separator can be used to separate a suspended and/or emulsified immiscible phase from an incoming aqueous feed stream, such separation is optional. For example, in some embodiments, the aqueous feed stream transported to the system is substantially free of a suspended and/or emulsified immiscible phase, or it contains an amount of suspended and/or emulsified immiscible phase that is sufficiently low that acceptable operation of the system can be obtained without using a water-immiscible phase separator.

A variety of water-immiscible phase separators are suitable for use according to certain of the embodiments described herein. In some embodiments, the water-immiscible phase separator at least partially separates the immiscible phase from the aqueous stream via gravity, centrifugal force, adsorption, and/or using a barrier. In some embodiments, the water-immiscible phase separator comprises a hydrocyclone, such as a de-oiling hydrocyclone. In some embodiments, the hydrocyclone can be configured to remove droplets of the immiscible phase having a diameter of greater than about 10 micrometers. In certain embodiments, the water-immiscible phase separator comprises a corrugated plate interceptor. In some embodiments, the corrugated plate interceptor can be configured to remove droplets of the immiscible phase having a diameter of greater than about 50 micrometers. In some embodiments, the water-immiscible phase separator comprises an adsorption media filter. The adsorption media filter can contain an adsorption medium. The adsorption medium may comprise, for example, walnut shells. In some embodiments, the adsorption media filter can be configured to remove droplets of the immiscible phase having a diameter of greater than about 150 micrometers. The water-immiscible phase separator comprises, according to certain embodiments, a coalescing media filter. The coalescing media filter can be configured, in some embodiments, to remove droplets of the immiscible phase having a diameter of less than about 2 micrometers. In some embodiments, the water-immiscible phase separator comprises a membrane filter. In certain embodiments, the membrane filter can be configured to remove droplets of the immiscible phase having a diameter of less than about 1 micrometer. In certain embodiments, the water-immiscible phase separator comprises a settling zone in which water and the immiscible phase are at least partially physically separated. The settling zone may comprise, for example, a crystallization tank (which can be, in some embodiments, a settling tank). As one example, the water-immiscible phase separator may comprise, according to certain embodiments, an American Petroleum Institute separator, commonly referred to as API separators. In some embodiments, the API separator can be configured to remove droplets of the immiscible phase having a diameter of greater than about 150 micrometers. According to some embodiments, the water-immiscible phase separator comprises a skimmer. In some embodiments, the water-immiscible phase separator comprises a dissolved gas floatation (DGF) apparatus. In certain embodiments, the water-immiscible phase separator comprises an induced gas flotation (IGF) apparatus. In some embodiments, the DGF and/or IGF apparatus can be configured to remove droplets of the immiscible phase having a diameter of greater than about 20 micrometers.

Certain embodiments are related to producing multivalent-ion-enriched streams for use in oil recovery. Oil reservoirs generally include porous rocks, the pores of which may contain oil. In some cases, injection of water rich in solubilized multivalent ions can aid in the extraction of oil from such pores. Accordingly, some embodiments comprise injecting a multivalent-ion-enriched product stream (e.g., any of the multivalent-ion-enriched product streams described herein) into a subterranean space. The subterranean space may comprise, for example, oil contained within the pores of a porous material (e.g., porous rocks or other porous materials). In certain embodiments, the subterranean space may be part of an oil well. In certain embodiments, the multivalent-ion-enriched stream that is injected into the subterranean space can be injected under pressure (e.g., under a gauge pressure of at least about 1 bar, at least about 2 bar, at least about 5 bar, at least about 10 bar, at least about 25 bar, or more). Certain embodiments can comprise recovering at least a portion of the monovalent-ion-enriched stream from the subterranean space. In certain embodiments, the aqueous feed stream used in the system (e.g., any of the aqueous feed streams described herein) can comprise at least a portion of the monovalent-ion-enriched stream recovered from the subterranean space.

Various components are described herein as being either directly fluidically connected or indirectly fluidically connected. Generally, a direct fluidic connection exists between a first region and a second region (and the two regions are said to be directly fluidically connected to each other) when they are fluidically connected to each other and when the composition of the fluid at the second region of the fluidic connection has not substantially changed relative to the composition of the fluid at the first region of the fluidic connection (i.e., no fluid component that was present in the first region of the fluidic connection is present in a weight percentage in the second region of the fluidic connection that is more than 5% different from the weight percentage of that component in the first region of the fluidic connection). As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations. In some embodiments, a direct fluidic connection between a first region and a second region can be configured such that the fluid does not undergo a phase change from the first region to the second region. In some embodiments, the direct fluidic connection can be configured such that at least about 50 wt % (or at least about 75 wt %, at least about 90 wt %, at least about 95 wt %, or at least about 98 wt %) of the fluid in the first region is transported to the second region via the direct fluidic connection.

U.S. Provisional Patent Application Ser. No. 62/205,636, filed Aug. 14, 2015 and entitled "Production of Multivalent Ion-Rich Process Streams Using Multi-Stage Osmotic Separation" is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A method, comprising:
   transporting an aqueous feed stream containing solubilized monovalent ions and solubilized multivalent ions into an ion-selective membrane separator comprising an ion-selective membrane to produce a first permeate stream containing at least about 75% of the solubilized monovalent ions from the aqueous feed stream and a first retentate stream containing at least about 75% of the solubilized multivalent ions from the aqueous feed stream;
   transporting at least a portion of the first permeate stream to a first osmotic membrane separator comprising a first osmotic membrane, such that the first permeate stream portion is transported across a first side of the first osmotic membrane;

transporting a first draw inlet stream across a second side of the first osmotic membrane;

applying a hydraulic pressure to the first side of the first osmotic membrane such that water is transported from the first permeate stream through the first osmotic membrane to the first draw inlet stream to produce a first draw product stream having a lower osmotic pressure than the first draw inlet stream;

transporting at least a portion of the first draw product stream from the second side of the first osmotic membrane to a second osmotic membrane separator comprising a second osmotic membrane, such that the first draw product stream portion is transported across a first side of the second osmotic membrane;

transporting a second draw inlet stream across a second side of the second osmotic membrane;

applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream; and combining at least a portion of the second draw product stream with at least a portion of the first retentate stream.

2. The method of claim 1, wherein the combining at least the portion of the second draw product stream with at least the portion of the first retentate stream comprises establishing a direct fluidic connection between the portion of the second draw product stream and the portion of the first retentate stream.

3. The method of claim 1, wherein the combining at least a portion of the second draw product stream with at least a portion of the first retentate stream comprises transporting the portion of the second draw product stream across a first side of an osmotic membrane of an osmotic membrane separator and transporting the portion of the first retentate stream across a second side of the osmotic membrane of the osmotic membrane separator.

4. The method of claim 3, wherein the transporting the portion of the second draw product stream across a first side of the osmotic membrane of the osmotic membrane separator results in the portion of the second draw product stream being transmitted through the osmotic membrane and subsequently combined with the portion of the first retentate stream.

5. The method of claim 1, wherein the combining at least the portion of the second draw product stream with at least the portion of the first retentate stream produces a multivalent-ion-enriched product stream.

6. The method of claim 5, wherein the multivalent-ion-enriched product stream contains at least about 75% of the solubilized multivalent ions from the aqueous feed stream.

7. The method of claim 5, wherein the ratio of solubilized multivalent ions within the multivalent-ion-enriched product stream to solubilized monovalent ions within the multivalent-ion-enriched product stream is at least about 3:1.

8. The method of claim 1, wherein the first osmotic membrane is used to perform reverse osmosis.

9. The method of claim 8, wherein the second osmotic membrane is used to perform forward osmosis.

10. The method of claim 1, comprising increasing the pressure of the aqueous feed stream, before it is exposed to the ion-selective membrane, using at least a portion of the pressure of a retentate product stream from the first osmotic membrane and/or the second osmotic membrane.

11. The method of claim 1, comprising removing at least a portion of a suspended or emulsified immiscible phase from the aqueous feed stream before the aqueous feed stream is transported to the ion-selective membrane separator.

12. The method of claim 1, wherein the first permeate stream portion and the first draw inlet stream are transported across the first osmotic membrane in a counter-current configuration.

13. The method of claim 1, wherein the first draw product stream and the second draw inlet stream are transported across the second osmotic membrane in a counter-current configuration.

14. The method of claim 1, wherein the ion-selective membrane has a molecular weight cut off of at least about 200 Da.

15. The method of claim 1, wherein the ion-selective membrane is a nanofiltration membrane.

16. The system of claim 1, wherein the first osmotic membrane has a molecular weight cut off of about 100 Da or less.

* * * * *